United States Patent
Weiss

(10) Patent No.: US 8,065,170 B2
(45) Date of Patent: Nov. 22, 2011

(54) METHOD AND SYSTEM FOR A DEFERRED VARIABLE ANNUITY WITH FLEXIBLE BENEFIT PAYMENTS

(75) Inventor: Joseph M. Weiss, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/022,141

(22) Filed: Feb. 7, 2011

(65) Prior Publication Data

US 2011/0131070 A1 Jun. 2, 2011

Related U.S. Application Data

(63) Continuation of application No. 11/985,694, filed on Nov. 16, 2007, now Pat. No. 7,885,834.

(60) Provisional application No. 60/961,793, filed on Jul. 24, 2007.

(51) Int. Cl.
*G06Q 40/00* (2006.01)
(52) U.S. Cl. .................... 705/4; 705/35; 705/36; 705/39
(58) Field of Classification Search .......... 705/4, 75–79; 902/22–29; 726/1–21
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,049,772 A | 4/2000 | Payne et al. | |
| 6,064,986 A | 5/2000 | Edelman | |
| 6,275,807 B1 | 8/2001 | Schirripa | |
| 6,611,808 B1 | 8/2003 | Preti et al. | |
| 6,611,815 B1 | 8/2003 | Lewis et al. | |
| 6,636,834 B1 | 10/2003 | Schirripa | |
| 6,868,358 B2 * | 3/2005 | Brown, Jr. | 702/138 |
| 6,950,805 B2 | 9/2005 | Kavanaugh | |
| 6,963,852 B2 | 11/2005 | Koresko | |
| 7,016,871 B1 | 3/2006 | Fisher et al. | |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,376,608 B1 * | 5/2008 | Dellinger et al. | 705/36 R |

(Continued)

OTHER PUBLICATIONS

"American Skandia Life Assurance Corp/CT", Publisher: Edgar Online, Dec. 31, 2007.*

(Continued)

*Primary Examiner* — Ella Colbert
*Assistant Examiner* — Hai Tran
(74) *Attorney, Agent, or Firm* — Howard IP Law Group, PC

(57) ABSTRACT

A computer implemented data processing system and method processes data associated with a deferred variable annuity contract during the accumulation phase for a relevant life. The annuity contract has a payment base value, a contract value, and available benefit payments. The system stores data indicative of a payout period having a duration greater than a year and a maximum total withdrawal percent for the payout period. The product of the maximum total withdrawal percent and the payment base value is a maximum benefit payment amount that may be withdrawn during the payout period without reducing the payment base value.

20 Claims, 11 Drawing Sheets

U.S. PATENT DOCUMENTS

| | | | |
|---|---|---|---|
| 7,398,241 | B2 | 7/2008 | Fay et al. |
| 7,613,644 | B1 | 11/2009 | Abbs et al. |
| 7,624,058 | B1 | 11/2009 | Abbs et al. |
| 2001/0014873 | A1 | 8/2001 | Henderson et al. |
| 2001/0047325 | A1 | 11/2001 | Livingston |
| 2002/0035527 | A1 | 3/2002 | Corrin |
| 2002/0174045 | A1 | 11/2002 | Arena et al. |
| 2002/0194098 | A1 | 12/2002 | Stiff et al. |
| 2003/0088430 | A1 | 5/2003 | Ruark |
| 2003/0105652 | A1 | 6/2003 | Arena et al. |
| 2003/0120570 | A1 | 6/2003 | Dellinger et al. |
| 2003/0163402 | A1 | 8/2003 | Kincart |
| 2003/0171956 | A1 | 9/2003 | Cox et al. |
| 2003/0187764 | A1 | 10/2003 | Abbs et al. |
| 2004/0039608 | A1 | 2/2004 | Mazur et al. |
| 2004/0088236 | A1 | 5/2004 | Manning |
| 2004/0172350 | A1 | 9/2004 | Atkinson et al. |
| 2004/0181436 | A1 | 9/2004 | Lange |
| 2004/0204951 | A1 | 10/2004 | Wood et al. |
| 2004/0267647 | A1 | 12/2004 | Brisbois |
| 2005/0010453 | A1 | 1/2005 | Terlizzi et al. |
| 2005/0060251 | A1 | 3/2005 | Schwartz et al. |
| 2005/0080698 | A1 | 4/2005 | Perg et al. |
| 2005/0144103 | A1 | 6/2005 | Perg et al. |
| 2005/0177473 | A1 | 8/2005 | Angle |
| 2005/0234821 | A1* | 10/2005 | Benham et al. ............... 705/40 |
| 2006/0074787 | A1 | 4/2006 | Perg et al. |
| 2006/0080148 | A1 | 4/2006 | Koresko |
| 2006/0085338 | A1 | 4/2006 | Stiff et al. |
| 2006/0089892 | A1 | 4/2006 | Sullivan et al. |
| 2006/0095353 | A1 | 5/2006 | Midlam |
| 2006/0111997 | A1 | 5/2006 | Abbott et al. |
| 2006/0111998 | A1 | 5/2006 | Fisher et al. |
| 2006/0143055 | A1 | 6/2006 | Loy et al. |
| 2006/0149651 | A1 | 7/2006 | Robinson |
| 2006/0155622 | A1 | 7/2006 | Laux |
| 2006/0190373 | A1 | 8/2006 | Perg et al. |
| 2006/0195375 | A1 | 8/2006 | Bohn |
| 2006/0206398 | A1* | 9/2006 | Coughlin ..................... 705/35 |
| 2006/0206401 | A1 | 9/2006 | Abbs et al. |
| 2006/0212379 | A1 | 9/2006 | Perg et al. |
| 2006/0212380 | A1 | 9/2006 | Williams et al. |
| 2007/0011063 | A1 | 1/2007 | Shelon et al. |
| 2007/0011069 | A1 | 1/2007 | Bevacqua, Jr. |
| 2007/0011086 | A1 | 1/2007 | Dellinger et al. |
| 2007/0021986 | A1 | 1/2007 | Cheung et al. |
| 2007/0038488 | A1 | 2/2007 | Bauer et al. |
| 2007/0078690 | A1 | 4/2007 | Kohl |
| 2007/0100715 | A1* | 5/2007 | O'Donnell et al. ............ 705/35 |
| 2007/0100720 | A1 | 5/2007 | Bonvouloir |
| 2007/0100726 | A1 | 5/2007 | O'Flinn et al. |
| 2007/0100727 | A1 | 5/2007 | Multer et al. |
| 2007/0106589 | A1 | 5/2007 | Schirripa |
| 2007/0162380 | A1 | 7/2007 | Conroy |
| 2007/0198352 | A1 | 8/2007 | Kannegiesser |
| 2007/0198377 | A1 | 8/2007 | Livingston et al. |
| 2007/0239572 | A1 | 10/2007 | Harris et al. |
| 2007/0244777 | A1 | 10/2007 | Torre et al. |
| 2007/0271201 | A1 | 11/2007 | Armand et al. |
| 2007/0288399 | A1* | 12/2007 | Reynolds et al. .......... 705/36 R |
| 2008/0046382 | A1* | 2/2008 | Metz ........................ 705/36 R |
| 2008/0071661 | A1 | 3/2008 | Jeudy et al. |
| 2008/0270194 | A1 | 10/2008 | West et al. |
| 2008/0306878 | A1* | 12/2008 | Elam et al. ................ 705/36 R |

OTHER PUBLICATIONS

The Right Rider: Boomers want guaranteed lifetime income, but don't want to buy an immediate annuity. Variable annuity issuers think they have a solution. Donald Jay Korn. Financial Planning. New York: Feb 1, 2006. p. 104-106.

Panko, Ron. New Products. Best's Review, 108(3), 24. Jul. 2007.

Antolin, Pablo. Longevity Risk and Private Pensions. Financial Market Trends,(92), 107,109-128. Jun. 2007.

Yates, Karen E & Liss, Stephen. Charitable Lead Annuity Trusts-A Primer. Taxation of Exempts, 19(1), 23. Jul. 2007.

Harshman, Scott & Schaller, Gordon. Private Annuities: An Income Tax Deferral Technique. Orange County Business Journal, 29(39), A56-A57. Sep. 2006.

Accelerated Death Benefits, http://www.medicare.gov/LongTermCare/Static/AceDeathBenefits.asp?dest=NAV%; no later than Jul. 23, 2007.

Alternatives to Long Term Care Insurance, http://www.senior-wealth-protection-advocates.com/long-term-care-insurancealternatives.html; no later than Jul. 23, 2007.

American Skandia Life Assurance Corpt/CT, publisher: Edgar Online, dated Dec. 31, 2007.

Anonymous, "Q2 2005 American Eqty Invt Life Hld Co Earnings Conference Call-Final", Aug. 4, 2005, Fair Disclosure Wire.

Anonymous, "Full disclosure variable life report. (Policy Analysis)", Nov. 13, 2006, National Underwriter Life & Health, v110, n43, p. 30.

Anonymous, "Risk Management: You've Come a Long Way, Baby", Aug. 1, 2005, Annuity Market News.

Blodget, H., Money for Nothing: The Real Trouble with Mutual Funds, Slate.com, Dec. 1, 2004.

Stout, R.G. et al.; "Dynamic Retirement Withdrawal Planning"; Financial Services Review 15 (2006) 117-131.

Facts about the New York Life Longevity Benefit Variable Annuity Product, New York Life Insurance Company, May 2007.

"Fidelity.com Glossary"; https://scs.fidelity.com/webxpress/help/topics/help_definition_p.shtml, no later than Jul. 23, 2007.

Form 485BPOS, (Apr. 26, 2006), Transamerica-NewLTC-LifetimeGMWB_May2006SECFiling.pdf.

Penn Mutual Variable Annuity Account III, SEC Form 497, filed Oct. 2, 2006.

Form N-4, Transamerica Life Insurance Company; Separate Account VA Y; filed Apr. 26, 2006.

Glossary of Insurance Terms, http://www.iii.org/media/glossary/; no later than Jul. 23, 2007.

Income Select for Life; https://www.transamericaadvisor.com/contentServer/MediaServer? uri=/site/tciidex/media/PDF/Annuities_TCl/Client_Approved_Material/Tips_and_Techniques/.BRIS.pdf; May 2007.

"Jackson Enhances Living Benefit Options within its Perspective Family of Variable Annuities"; http://findarticles.com/p/articles/mi_m0EiNtis_2007_April_30/ai_n19041944, Apr. 30, 2007.

"Just the Facts: The Best of America All American Gold Annuity Key Facts"; Nationwide Financial Services, Inc.; https://ssc.nwservicecenter.com/media/pdf/product/VAM-0504AO-FLpdf; Mar. 2006.

"Key to Making Retirement Savings Last: The Withdrawal Rate"; http://www.newyorklife.com/cda/0,3254,141.98,00. html; no later than Jul. 23, 2007.

Lifetime Legacy, http://www.americo.com/lifetime/lifetimelegacy.html, no later than Jul. 23, 2007.

"Making IRAs Last a Lifetime with Annuities"; http://www.fpamd.org/documents/MakingIRAsLastaLifetimewithAnnuities.pdf; Mar. 2006.

New York Life Longevity Benefit Variable Annuity Brochure, New York Life Insurance Company, May 2007.

New York Life Longevity Benefit Variable Annuity FactSheet, New York Life Insurance Company, May 2007.

New York Life Longevity Benefit Variable Annuity Prospectus Amendment dated Aug. 15, 2007, New York Life Insurance Company, Aug. 2007.

Pacific One Select Investor Guide; (Nov. 2007) http://www.mutualfunds.pacificlife.com/public/mutual_funds/product_info/individual_k/pdfs/d5026.pdf.

Paradis, T., More Funds Adopt Performance-Based Fees, Washingtonpost.com (Associated Press), Apr. 8, 2007.

Prospectus, Penn Mutual Variable Annuity Account III, Enhanced Credit Variable Annuity; May 1, 2007.

"Prudential Investments Introduces Strategic Partners Annuity One; New Variable Annuity Offers Investors World-Class Money Managers and Flexible Product Features"; http://findarticles.com/p/articles/mi mOEIN/is_2000_Oct 9/ai_65846822.

Retireonyourterms; http://www.retireonyourterms.com/ glossary/GlossaryText.htm, no later than Jul. 23, 2007.

RiverSource Innovations Select Variable Annuity; http://www.riversource.com/rvsc/global/docs/INNOV-SELECT-NY-AAG.pdf, no later than Jul. 23, 2007.

"Scudder Investments Introduces Two New Variable Annuity Products with Travelers Life & Annuity", Jun. 9, 2003, PR newswire, pp. 1-4.

Shapiro et al. "Separating Annuity Buyers by Fixed Vs. Variable", Apr. 5, 1993, National Underwriter Life.Health.Financial Services), V97, N14, pp. 20-21.

The Power and Protection of Income Annuities, (Empire Fidelity Investments Life Insurance Company), http //personal.fidelity.com/products/annuities/pdf/IncomeAnnuitySpecialReport.pdf, Mar. 2006.

Granza, Lee et al.; "Financing long-term care: Employee needs and attitudes, and the employer's role"; Benefits Quarterly, Brookfield: 4th qtr 1988. vol. 14, Iss. 4, 13 pgs.

Pizzani, Lori; "Annuity Helps with Long-Term Care", Annuity Market News, Sep. 1, 1999, 2 pgs.

Anonymous; Part IV: Insurance: Protecting What You've Got—Chapter 16: Insurance on You: Life, Disability and Health; Personal Finance for Dummies (5th ed.); Hoboken: 2006, 23 pgs.

* cited by examiner

METHOD AND SYSTEM FOR A DEFERRED VARIABLE ANNUITY WITH FLEXIBLE BENEFIT PAYMENTS

CROSS-REFERENCE TO RELATED APPLICATIONS

This application is a continuation application of co-pending U.S. patent application Ser. No. 11/985,694 entitled METHOD AND SYSTEM FOR A DEFERRED VARIABLE ANNUITY WITH FLEXIBLE LIFETIME BENEFIT PAYMENTS, filed Nov. 16, 2007, which in turn claims priority to and benefit of U.S. Provisional Patent Application No. 60/961,793, filed Jul. 24, 2007, the entire contents of each of which are herein incorporated by reference for all purposes.

BACKGROUND OF THE INVENTION

1. Field of the Invention

The present invention relates to a method and system for administering a deferred annuity with flexible lifetime benefit payments; and more particularly, to a data processing method for administering a deferred annuity contract during the accumulation phase for a relevant life, the annuity contract having a payment base value, a contract value, and yearly lifetime benefit payments.

2. Description of the Prior Art

An immediate annuity is typically used to provide an income stream within a predetermined length of time from the date the premium is received. The amount of income can be either fixed or variable in nature and typically these products do not provide an account value. A deferred annuity is typically used to provide accumulation and, potentially, a future stream of annuity income. The deferred annuity comprises an accumulation period during which the account value will vary with the underlying investments and an annuitization period where the client purchases an immediate annuity with the account value available. Deferred and immediate annuities typically provide guaranteed income for life which transfers some portion or all of the risk of outliving one's accumulated assets to the insurer.

One basis for distinguishing commonly available deferred annuities is whether the annuity is classified as a "fixed annuity" or a "variable annuity". In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee". The rate credited on a fixed annuity is reset periodically, moving in an amount and a direction that correlate the yields available on fixed-income investments available to the insurer.

With a variable annuity, the annuity contract owner bears the investment risk. The relevant life typically has a choice of funds in which he/she can direct where the annuity deposits will be invested. The various funds or sub-accounts may include stocks, bonds, money market instruments, mutual funds, and the like.

Variable annuity contracts typically provide a death benefit. Oftentimes during the accumulation period this death benefit is related to the contract value. That is, if the sub-accounts backing the contract value have performed poorly, then the death benefit may be reduced to an insignificant amount. After annuitization, the death benefit can be a function of the remaining payments of the annuity at the time of the relevant life's death. Further, if the annuity contract does not provide a guarantee (discussed below), the contract will terminate when the contract value goes to zero or some other amount specified in the contract or rider.

Annuity contracts may also provide guarantees in several different variations. A Guaranteed Minimum Death Benefit (GMDB) is a guarantee that provides a minimum benefit at the death of the relevant life regardless of the performance of the underlying investments. A Guaranteed Minimum Income Benefit (GMIB) is a guarantee that will provide a specified income amount at the time the contract is annuitized. The income payment will be dependent on previously stated details set out in the contract. A Guaranteed Minimum Accumulation Benefit (GMAB) is a benefit that guarantees a specified contract value at a certain date in the future, even if actual investment performance of the contract is less than the guaranteed amount. A Guaranteed Minimum Withdrawal Benefit (GMWB) is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider.

Most deferred variable annuity products in the prior art typically determine the amount of the yearly lifetime benefit payments, if any, to be a predetermined percentage (withdrawal percent) of a withdrawal base. The withdrawal base amount is typically set at the time of the first lifetime benefit payment and is fixed for the remainder of the term of the annuity product. Further, the withdrawal percent is typically fixed after the first lifetime benefit payment is requested, or alternatively the withdrawal percent varies slightly for the remainder of the term of the annuity product.

Many financial products and systems have been disclosed. These include: information relevant to financial products having a future benefit conditioned on life expectancies of both an insured and a beneficiary; a post employment qualified health care benefit plan funded during a covered person's working years to covered persons under the plan, a retirement plan funded with a variable life insurance policy and/or a variable annuity policy; a benefit plan providing systematic withdrawal payments during a liquidity period and annuity payments when the systematic withdrawal payments cease, and financial instruments providing a guaranteed growth rate and a guarantee of lifetime payments.

Each one of these prior art references suffers from at least the following disadvantage(s): the relevant life does not have the flexibility to be able to select how to spread a total withdrawal percent over a payout period that is greater than one year, in the form of yearly lifetime benefit payments.

Accordingly, there remains a need in the art for a data processing method for administering a deferred annuity contract for a relevant life wherein the annuity contract allows the relevant life enhanced flexibility for selecting a particular withdrawal percent for each given year during the contract. Further, needed in the art is a deferred annuity contract having a series of payout periods, wherein the number of years of each payout period is greater than one year and wherein each payout period has a predetermined total withdrawal percent; and wherein the amount of the lifetime benefit payment withdrawal for each given year within a given payout period is determined by receiving an instruction from the relevant life that provides a withdrawal percent to use for each given year, wherein the sum of the withdrawal percents from each given year within the payout period is equal to or less than the predetermined total withdrawal percent that is allowed for the given payout period.

SUMMARY OF THE INVENTION

The present invention provides a data processing method for administering a deferred annuity contract during the accumulation phase wherein the annuity contract has a payment base, a contract value, and yearly lifetime benefit payments comprising the steps of: (i) selecting the number of years of a first payout period for the lifetime benefit payments, wherein the number of years of the first payout period is greater than one year; (ii) selecting a maximum total withdrawal percent for the first payout period; (iii) if requested by the relevant life, periodically calculating a yearly lifetime benefit payment withdrawal for the relevant life which decreases the contract value. Wherein the amounts of the lifetime benefit payment withdrawals for each given year within the first payout period are determined by receiving an instruction from the relevant life that provides a withdrawal percent to use for each given year. Wherein the withdrawal percents provided by the relevant life's instruction may differ for each given year within the first payout period. Wherein the sum of the withdrawal percents from each given year within the first payout period, as provided by the relevant life's instruction, is equal to or less than the predetermined maximum total withdrawal percent that is allowed for the first payout period; and (iv) repeating the above method steps at the conclusion of each payout period.

In prior art annuity products, the amount of the lifetime benefit payments, if any, is determined to be a predetermined percentage of a withdrawal base. This predetermined percentage typically is substantially fixed for the remainder of the contract, or alternatively, increases slightly for the remainder of the term as the relevant life ages.

The data processing method and system of the invention maintains or guarantees an annuity with yearly lifetime benefit payments. The data processing method administers an annuity contract having a payment base, a contract value, together with lifetime benefit payments.

Generally stated, the method of the invention predetermines the number of years of a given payout period for the lifetime benefit payments, wherein the number of years of the given payout period is greater than one year. The method predetermines a maximum total withdrawal percent for the given payout period. If requested by the relevant life, the method periodically calculates a yearly lifetime benefit payment for the relevant life which decreases the contract value. The amount of the lifetime benefit payment withdrawal for each given year within the given payout period is determined by receiving an instruction from the relevant life that provides a withdrawal percent to use for each given year, wherein the sum of the withdrawal percents from each given year within the given payout period is equal to or less than the predetermined maximum total withdrawal percent that is allowed for the first payout period.

In an alternative embodiment, the method of the invention determines a payment base for the annuity product that is a function of the previous premium payments and withdrawals by the relevant life, and could include investment performance on an annual or other basis (daily, monthly, etc.) and, if requested by the relevant life, the method periodically accepts premium payments from the relevant life which increase the payment base and the contract value.

In one embodiment, each of the yearly lifetime benefit payment withdrawals during a given payout period are determined by the following formulas:

LBP withdrawal(year 1)=(the Payment Base)×(the year 1 Withdrawal Percent), wherein (the year 1 Withdrawal Percent) is selected by the relevant life;

LBP withdrawal(year 2)=(the Payment Base)×(the year 2 Withdrawal Percent), wherein (the year 2 Withdrawal Percent) is selected by the relevant life;

LBP withdrawal(year X)=(the Payment Base)×(the year X Withdrawal Percent), wherein (the year X Withdrawal Percent) is selected by the relevant life;

wherein X=(the number of years of the given payout period);

wherein [(the year 1 Withdrawal Percent)+(the year 2 Withdrawal Percent)+(the year X Withdrawal Percent)] is equal to or less then (the maximum total Withdrawal Percent for the given payout period), wherein (the maximum total Withdrawal Percent for the given payout period) is predetermined by the company issuing the annuity product.

In another embodiment, the method predetermines a yearly withdrawal percent chart that provides a withdrawal percent for each year of the relevant life's future age, and wherein (the maximum total withdrawal percent for the given payout period)=(the predetermined yearly withdrawal percent at the first year of the given payout period according to the withdrawal percent chart)×(the number of years of the given payout period).

It is important to note that, in alternative embodiments, the maximum total withdrawal percent for a given payout period is not established by any specific formula, but rather is predetermined and is an arbitrary number. For example, the maximum total withdrawal percent could be predetermined to be 15% over a given three year payout period.

Preferably, the annuity contract of the data processing method is a deferred variable annuity and further includes sub-accounts whose market performance can cause the contract value to increase or decrease. In other aspects of the invention, the annuity contract may be selected from the group of fixed, combination variable/fixed, and equity indexed annuities.

In addition, the account may be subject to M, E & A, 12 b-1 and fund level charges. These charges may or may not be assessed against the contract value.

The guaranteed death benefit is paid to the beneficiary only if the relevant life dies during the accumulation phase. However, a guaranteed death benefit may also be payable during annuitization as well. The yearly lifetime benefit payment may be paid once yearly or periodically throughout the year; however, there is a maximum lifetime benefit payment for any given payout period. In prior art annuity products, the relevant life receives lifetime benefit payments that are based on a fixed withdrawal percent, or a withdrawal percent that slightly increases over time. On the other hand, the present method allows the relevant life to have the opportunity to request a lifetime benefit payment during each period that is based on a withdrawal percent that is selected by the relevant life. Therefore, the lifetime benefit payment is not based on a fixed percentage of a withdrawal base amount, and the withdrawal percent may fluctuate depending on the preferences and needs of the relevant life. The maximum total withdrawal percent for any given payout period may not be exceeded however. Accordingly, the relevant life has the opportunity to request a yearly lifetime benefit payment that has the potential to afford a greater flexibility in value then the lifetime benefit payments of prior art annuity contracts.

In one aspect, the value of the annuity payments, if necessary, equals the value of the most recent guaranteed lifetime benefit payment. In other aspects, excess withdrawals, required minimum distributions or step-ups could cause the value of the annuity payments or guaranteed lifetime benefit payments to change.

In another aspect of the invention, the present invention comprises a deferred annuity contract comprising: (i) means for determining a series of payout periods, wherein the number of years of each payout period is greater than one year; (ii) means for determining a maximum total withdrawal percent for each payout period; and (iii) means for calculating the amount of the lifetime benefit payment withdrawal for each given year within a given payout period by receiving an instruction from the relevant life that provides a withdrawal percent to use for each given year. Wherein the sum of the withdrawal percents from each given year within the payout period is equal to or less than the predetermined maximum total withdrawal percent that is allowed for the given payout period.

In another aspect of the invention, the present invention comprises a system for administering a deferred variable annuity contract during the accumulation phase, the annuity contract having a payment base value, a contract value, and lifetime benefit payments, comprising: a storage device; a processor coupled to the storage device, the storage device storing instructions that are utilized by the processor, the instructions comprising: (i) an instruction for receiving information from a relevant life in order to establish the deferred variable annuity contract; (ii) an instruction for receiving lifetime benefit payment withdrawal requests from the relevant life; (iii) an instruction to predetermine a series of payout periods, wherein the number of years of each payout period is greater than one year; (iv) an instruction to predetermine a maximum total withdrawal percent for each payout period; (v) an instruction to calculate the amount of the lifetime benefit payment withdrawal for each given year within a given payout period by receiving an instruction from the relevant life that provides a withdrawal percent to use for each given year. Wherein the sum of the withdrawal percents from each given year within the payout period is equal to or less than the predetermined maximum total withdrawal percent that is allowed for the given payout period.

The present invention solves several of the problems associated with conventional administration of annuity contracts. Determination of the lifetime benefit payment is accomplished via an improved formula that provides the potential to afford a greater flexibility for the value of each yearly lifetime benefit payment than prior art annuity contracts. The relevant life is afforded increased security by the enhanced flexibility afforded in selecting the withdrawal percent for the yearly lifetime benefit payments, according to the present invention.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DESCRIPTION OF THE PREFERRED EMBODIMENTS

Figure 1:
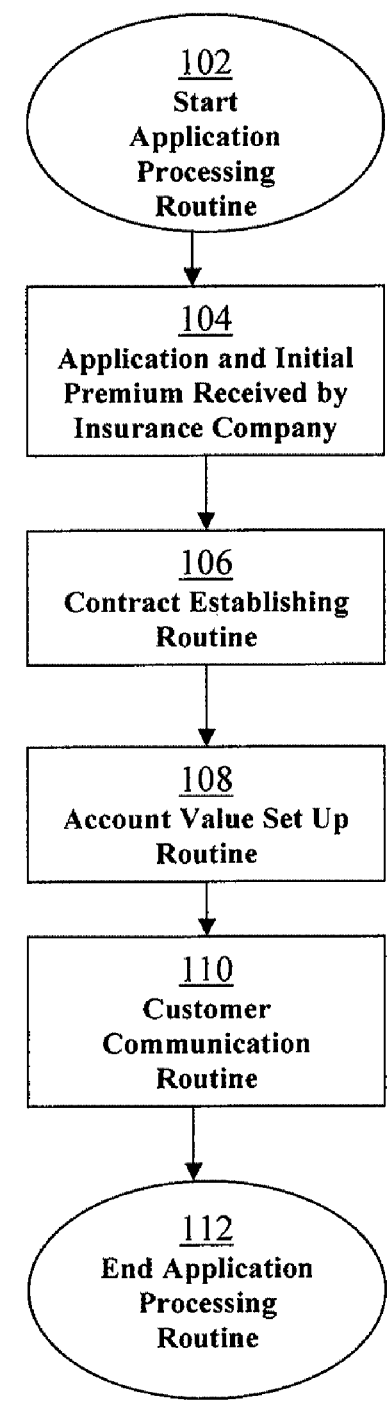
FIG. 1 is a flow chart illustrating the manner in which a new annuity contract application is processed.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. They are deemed to afford the best embodiment for purposes of disclosure; but should not be construed as limiting the scope of the invention. The following presents a detailed description of the preferred embodiment of the present invention.

The present invention comprises a data processing method for administering a deferred annuity contract having a payment base, a contract value, and yearly lifetime benefit payments. As used herein, the term "annuity contract" means a set of rules and other data that are reflected in a computer processing system for operations of the annuity product. In the present invention, the lifetime benefit is not a fixed percentage of a withdrawal base. Instead, the yearly lifetime benefit payment available for each period is selected by the relevant life by selecting the withdrawal percent for the given year. The present data processing method is preferably in the form of a rider to an annuity contract. The contract may be variable or fixed. In another aspect of the invention, the present data processing method is not in the form of a rider, but is a part of the base contract.

In exchange for paying higher fees, the relevant life receives several advantages by selecting the method and system of the present invention which provides a flexible lifetime benefit payment available for each period that is selected by the relevant life as described herein. These advantages include the following: The relevant life will have the opportunity to request yearly lifetime benefit payment amounts based on the relevant life's preferences. Therefore, the lifetime benefit payment is not based on a substantially fixed percentage of a withdrawal base amount. Instead, the withdrawal percent that is selected by the relevant life for each lifetime benefit payment amount may fluctuate depending on the preferences of the relevant life and according to the limitations described herein. Accordingly, the relevant life has the opportunity to request a lifetime benefit payment in any given year that is much higher than a typical lifetime benefit payment. This type of flexibility is not provided by prior art annuity products.

Further, the relevant life has the ability to skip lifetime benefit payments in any given year without surrendering the withdrawal amount. Similarly, the relevant life has the ability to take an increased lifetime benefit withdrawal in any given year without damaging the core structure of the product and without decreasing the payment base (provided the increased lifetime benefit withdrawal adheres to the limitations provided herein). The relevant life is provided with enhanced flexibility in deciding the amount of the lifetime benefit payments for each year. Such flexibility allows the relevant life to adjust the amount of the lifetime benefit payments according to changing needs—whether foreseen or unforeseen.

The relevant life achieves flexibility to take withdrawals in a customized manner. Therefore, the relevant life has the ability to meet unplanned expenses by taking larger withdrawals without negatively impacting the benefits of the contract. The present invention further prevents the necessity to lock in a set future stream of income before the relevant life knows his/her future needs. The present invention provides the ability to take withdrawals based on a period of time greater than one year, meaning the withdrawals year after year can change as long as the total withdrawals over a period of years stays within the constraints of the contract. The relevant life has the ability to "advance" withdrawals by taking more in the first year, taking from future years, without negatively impacting the benefits of the contract.

The present invention comprises a data processing system and method for administering a deferred annuity contract during the accumulation phase for a relevant life, the annuity contract having a payment base, a contract value and yearly lifetime benefit payments, comprising the steps of: (i) selecting the number of years of a first payout period for the lifetime benefit payments, wherein the number of years of the first payout period is greater than one year; (ii) selecting a maximum total withdrawal percent for the first payout period; (iii) if requested by the relevant life, periodically calculating a yearly lifetime benefit payment withdrawal for the relevant life which decreases the contract value. Wherein the amounts of the lifetime benefit payment withdrawals for each given year within the first payout period are determined by receiving an instruction from the relevant life that provides a withdrawal percent to use for each given year, and wherein the withdrawal percents provided by the relevant life's instruction may differ for each given year within the first payout period. Additionally, the sum of the withdrawal percents from each given year within the first payout period, as provided by the relevant life's instruction, is equal to or less than the predetermined maximum total withdrawal percent that is allowed for the first payout period; and (iv) repeating the above method steps at the conclusion of each payout period.

In another aspect, the present invention comprises a system for administering a deferred variable annuity contract during the accumulation phase, the annuity contract having a payment base value, a contract value, and lifetime benefit payments, comprising: a storage device; a processor coupled to the storage device, the storage device storing instructions that are utilized by the processor, the instructions comprising: (i) receiving information from a relevant life in order to establish the deferred variable annuity contract; (ii) receiving lifetime benefit payment withdrawal requests from the relevant life; (iii) predetermining a series of payout periods, wherein the number of years of each payout period is greater than one year; (iv) predetermining a maximum total withdrawal percent for each payout period; (v) calculating the amount of the lifetime benefit payment withdrawal for each given year within a given payout period by receiving an instruction from the relevant life that provides a withdrawal percent to use for each given year. Wherein the sum of the withdrawal percents from each given year within the payout period is equal to or less than the predetermined maximum total withdrawal percent that is allowed for the given payout period.

It should be understood that as used herein the term "periodically" includes method steps that in certain aspects may only be performed once. In other aspects, such "periodically" performed method steps may be performed more than once as described herein.

The following definitions are given hereunder to better understand terms used in the specification.

"Relevant Life" or "Covered Life": The term relevant life or covered life is the governing life for determination of the living benefits provided under this illustrative embodiment. Covered life (or relevant life) may refer to any one or more of the following: an owner, joint owner, annuitant, joint annuitant, co-owner, co-annuitant or beneficiary.

"Withdrawal Base": The withdrawal base is the amount used in one embodiment of the present invention to determine the lifetime benefit payment. Preferably, the withdrawal base may be equal to the amount of the original premium, the payment base value, the contract value, or the greater of the payment base value and the contract value.

"Payment Base": The payment base (PB) (or more accurately the payment base value) is the amount used in one embodiment of the present invention to determine the lifetime benefit payment and the rider charge. In one embodiment of the present invention, the initial payment base value equals the initial premium.

"Premium": 100% of the dollar amount of the initial or subsequent premium payments deposited into the contract before application of any sales charges or payment enhancements.

"Withdrawal Request": A request made by the relevant life to withdraw funds during the "accumulation phase" of the contract. One type of withdrawal is a lifetime benefit payment. Any withdrawal that is in excess of the lifetime benefit payment may: (i) decrease the contract value below the minimum contract value; (ii) decrease the payment base value; and (iii) decrease the guaranteed death benefit.

"Lifetime Benefit Payment": A benefit payment that is available until the death of the relevant life. The lifetime benefit payment may be paid yearly in one embodiment. The total lifetime benefit payment for the year may also be distributed monthly, quarterly or any other defined period. Preferably, the lifetime benefit payment is only available if the covered life age is 60 (or other predetermined age) or older. Preferably, if the relevant life is age 59 (or other predetermined age) or younger, the LBP is equal to zero. Other age restrictions can also be utilized for the lifetime benefit payment. In one embodiment, the lifetime benefit payment is determined by one of the following formulas:

LBP withdrawal(year 1)=(the Payment Base)×(the year 1 Withdrawal Percent), wherein (the year 1 Withdrawal Percent) is selected by the relevant life;

LBP withdrawal(year 2)=(the Payment Base)×(the year 2 Withdrawal Percent), wherein (the year 2 Withdrawal Percent) is selected by the relevant life;

LBP withdrawal(year X)=(the Payment Base)×(the year X Withdrawal Percent), wherein (the year X Withdrawal Percent) is selected by the relevant life;

wherein X=(the number of years of the given payout period);

wherein [(the year 1 Withdrawal Percent)+(the year 2 Withdrawal Percent)+(the year X Withdrawal Percent)] is equal to or less then (the maximum total Withdrawal Percent for the given payout period), and wherein (the total Withdrawal Percent for the given payout period) is predetermined by the company issuing the annuity product.

It should be understood that in other embodiments of the present invention, other formulas may be utilized for determining the lifetime benefit payment. It is important to note that, in alternative embodiments, the maximum total withdrawal percent for a given payout period is not established by any specific formula, but rather is predetermined and is an arbitrary number.

"Contract Value": The contract value (CV) is a numerical measure of the relative worth of a variable annuity product during the accumulation phase. The contract value is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the contract value.

"Sub-account": Variable account investments within the variable annuity contract, such as mutual funds, stocks and bonds.

"Withdrawal": Also known as a "surrender", a relevant life may withdraw up to the contract value at any time.

"Death Benefit": The death benefit provision guarantees that upon the death of the relevant life a death benefit (DB) is paid to a beneficiary named in the contract that is equal to the greater of the guaranteed death benefit or the contract value as of the date the annuity company receives due proof of death. It should be understood that in other embodiments of the present invention, other formulas may be utilized for determining the guaranteed death benefit.

"Benefit Amount": In one embodiment of the present invention, the benefit amount is used to calculate that amount of the death benefit. Preferably, the benefit amount is equal to the premium payments minus any lifetime benefit payments or withdrawals.

"AMF": Annual Maintenance Fee.

"Annuity Commencement Date": The annuity commencement date (ACD) is the date upon which the contract enters the "annuitization phase".

"Withdrawal Percent": In one embodiment of the present invention, the withdrawal percent (WP) is used to determine the amount of the lifetime benefit payment. It should be understood that in other embodiments of the present invention, other formulas may be utilized for determining the lifetime benefit payment.

"PB increase": Payment Base increase.

"Step-Up": An increase to the payment base value that is available if the contract value increases because of favorable performance of the underlying investments. Preferably, the step-up is guaranteed at a predetermined percentage.

"Partial Surrender": Partial surrender means the gross amount of the partial surrender and will include any applicable contingent deferred sales charges.

"Covered Life Change": Any contractual change before ACD which causes a change in the covered life will result in a reset in the benefits provided under the rider and allows the issuing company to impose the fund allocation restrictions.

"Annuity Contract": The term annuity contract means a set of rules and other data that are reflected in a computer processing system for operations of the annuity product.

"Issue Rules": The issuance of a contract may be subject to established requirements known as issue rules.

The following detailed illustrative embodiment(s) is presented to provide a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

Covered Life in Single and Joint/Spousal Election(s)

The covered life, or relevant life, may have a single life election or joint/spousal continuation election as described more fully herein.

Single Life Election:

If a natural owner, the covered life is the owner and the joint owner (if any) on the rider effective date. If a non-natural owner, the covered life is the annuitant on the rider effective date. All age-contingent benefit provisions are based on the attained age of the oldest covered life.

Joint/Spousal Continuation Election:

If a natural owner, the covered life is both spouses (as defined by Federal Law). All age-contingent benefit provisions are based on the attained age of the youngest covered life.

Issues Rules

The following issue rules are set forth to provide a more complete understanding of this illustrative embodiment of the present invention. It should be understood by those skilled in the art that these issue rules are set forth for illustrative purposes only and that other rules may be utilized. Accordingly, the issue rules set forth below should not be construed as limiting the scope of the invention.

The issue rules may include a maximum issue age. In one embodiment, the riders are not available if any covered life or annuitant is age 81 (or other predetermined age) or greater on the rider effective date. In another embodiment, the riders are not available if any covered life or annuitant is age 76 (or other predetermined age) or greater on the Rider effective date. The rider may be elected on contract issue or post-issue.

Single Life Election: No Additional Requirements
Joint/Spousal Continuation Election: (this May Also Include Co-Annuitants)
One of the following must apply:
- If a natural owner purchases Joint/Spousal election, and adds a spousal joint owner, then the owner can name anyone else as the designated beneficiary, because by contract disposition, the joint owner will receive the death benefit.
- If a natural owner purchases joint/spousal election, and does not add a joint owner, then the owner must name their spouse as the designated beneficiary.
- If a non-natural owner purchases joint/spousal election, then the annuitant's spouse must be the designated beneficiary.

A joint owner who is not the owner's spouse is not allowed.

Calculation of the Withdrawal Percent (WP)

The Withdrawal Percent (WP) is used to determine the amount of the lifetime benefit payment. There are two types of withdrawal percents: (i) the predetermined withdrawal percent (shown below); and (ii) the withdrawal percent elected by the relevant life during each given year.

The WP is determined at the later of; (i) the attained age of the covered life on the most recent contract anniversary prior to the first withdrawal, or (ii) the contract anniversary immediately following the covered life's $60^{th}$ birthday (or other predetermined age).

Single Life Election:
  (Note: the following percentages and ages, if ages are in fact used, can vary)
  5.0% for attained ages 60 to 64;
  5.5% for attained ages 65 to 69;
  6.0% for attained ages 70 to 74;
  6.5% for attained ages 75 to 79; and
  7.0% for attained ages 80 and above.
Joint/Spousal Continuation Election:
  4.5% for attained ages 60 to 64;
  5.0% for attained ages 65 to 69;
  5.5% for attained ages 70 to 74;
  6.0% for attained ages 75 to 79; and
  6.5% for attained ages 80 and above.

Calculation of the Payment Base (PB)

The Payment Base (PB) (or more accurately payment base value) is the amount used to determine the lifetime benefit payment (LBP) and the rider charge.

A total partial surrender amount in a contract year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents. The maximum PB is $5,000,000.

If this rider is effective on the contract issue date, then the PB equals the X % of the initial premium. If this rider is effective after the contract issue date, then the PB equals 100% of the dollar amount of the contract value on the rider effective date, less any payment enhancements received in the last twelve months.

When subsequent premium payments are received, the PB will be increased by 100% of the dollar amount of the subsequent premium payment. Whenever a partial surrender is made prior to the contract anniversary immediately following the covered life's $60^{th}$ birthday (or other predetermined age), the payment base is reduced for an adjustment defined below.

"Threshold" definition: 5% single/4.5% joint/spousal multiplied by the greater of the payment base or contract value at the beginning of the contract year plus subsequent premiums prior to a partial surrender.

For cumulative partial surrenders during each contract year that are equal to or less than the threshold, the adjustment is equal to the dollar amount of the partial surrender.

For any partial surrender that first causes cumulative partial surrenders during the contract year to exceed the threshold, the adjustment is the dollar amount of the partial surrender that does not exceed the threshold. For the portion of the withdrawal that exceeds the threshold, the adjustment is a factor. The factor is as follows:

$$1-(A/(B-C)) \text{ where}$$

A=partial surrenders during the contract year in excess of the threshold;
B=contract value immediately prior to the partial surrender; and
C=the threshold, less any prior partial surrenders during the contract year. If C results in a negative number, C becomes zero.

For partial surrenders during each contract year, where the sum of prior partial surrenders are in excess of the threshold, the adjustment is a factor. The factor is applied to the payment base immediately before the surrender. The factor is as follows:

$$1-(A/B) \text{ where}$$

A=the amount of the partial surrender;
B=contract value immediately prior to the partial surrender.

Whenever a partial surrender is made on or after the contract anniversary immediately following the covered life's $60^{th}$ birthday (or other predetermined age), the PB will be equal to the amount determined as follows:
  If the total partial surrenders since the most recent contract anniversary are equal to or less than the current lifetime benefit payment (LBP), the PB is not reduced by the amount of the partial surrender.
  If the total partial surrenders since most recent contract anniversary are more than the current LBP, but all partial surrenders were paid under the Automatic Income Required Minimum Distribution (AI RMD), the PB is not reduced by the amount of partial surrender.

For any partial surrender that first causes cumulative partial surrenders during the contract year to exceed the current LBP and the RMD exception above does not apply the adjustment is a factor. The factor is as follows:

$$1-(A/(B-C)) \text{ where}$$

A=partial surrenders during the contract year in excess of the LBP;
B=contract value immediately prior to the partial surrender; and
C=the LBP, less any prior partial surrenders during the contract year. If C results in a negative number, C becomes zero.

For additional partial surrender(s) in a contract year, where the sum of all prior partial surrenders exceed the current LBP, the PB will be reduced by applying a factor. The factor is as follows:

1−(A/B) where

A=the amount of the partial surrender;
B=contract value immediately prior to the partial surrender.

Benefit Increase Provision

In one embodiment, the withdrawal percent will be set at the attained age of the first withdrawal and will not increase thereafter. In another embodiment, the benefit increase is facilitated through an increase of the payment base.

On every contract anniversary up to and including the contract anniversary immediately following the covered life's $80^{th}$ birthday (or other predetermined age), it will be determined as to whether an increase in the PB is applicable. If an increase is applicable, the PB will increase by the factor below, subject to a minimum of zero and a maximum of 10% (note: the percentage could change or it could be a full step up (no limit)):

(contract value prior to rider charge taken on current anniversary/maximum contract value)−1 where maximum contract value equals the greater of (A) or (B) below:
(A) the contract value on the rider effective date, plus premiums received after the rider effective date;
(B) the contract value on each subsequent contract anniversary, excluding the current contract anniversary plus premiums received after the contract anniversary date. (Similar to MAV except that there is no adjustment for withdrawals.)

The WP is locked in on the date of the first withdrawal.

Calculation of the Lifetime Benefit Payment

The LBP is available until the death of any covered life or until the withdrawal benefit is revoked.

A total partial surrender amount in a contract year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents.

On the Rider effective date, the following applies to the calculation of the LBP.
If the covered life is Age 60 (or other predetermined age) or older on the rider effective date, the LBP is equal to the payment base multiplied by the WP for the covered life's attained age.
If the covered life is Age 59 (or other predetermined age) or younger on the rider effective date, the LBP is equal to zero.

On any contract anniversary immediately following the covered life's $60^{th}$ birthday (or other predetermined age), applies to the calculation of the LBP.

Option 1: The LBP is equal to the WP multiplied by the greater of payment base or the contract value on the anniversary for both the age-based and the market-based riders, single and spousal. The LBP can fluctuate year to year due to market performance, but will never be lower than the WP multiplied by the PB as long as the covered life has reached the age of 60 (or other predetermined age). Also, if the account value on the anniversary exceeds the PB, the LBP may decrease in future years but will never be less than the PB multiplied by the WP.

When a subsequent premium payment is made after the contract anniversary immediately following the covered life's $60^{th}$ birthday (or other predetermined age), the LBP is equal to the greater of: (i) the WP, on the most recent contract anniversary, multiplied by the greater of the PB or contract value immediately after the subsequent premium is received, or (ii) the prior LBP.

Whenever a partial surrender is made on or after the contract anniversary immediately following the covered life's $60^{th}$ birthday (or other predetermined age):
If the PB is 0 (zero) due to withdrawals, the LBP is equal to 0 (zero). During the deferral stage, subsequent premiums may be made to re-establish the PB and the LBP.

The LBP will be equal to the amount determined in either one as follows:
If the total partial surrenders since the most recent contract anniversary are equal to or less than the current lifetime benefit payment (LBP), the LBP is equal to the LBP immediately prior to the partial surrender.
If the total partial surrenders since the most recent contract anniversary are more than the current LBP, but all partial surrenders were paid under the Automatic Income Required Minimum Distribution (AI RMD), the provisions of above will apply.
If the total partial surrenders since the most recent contract anniversary are more than the current LBP and the AI RMD exception in above does not apply, the LBP is reset to the WP on the most recent contract anniversary multiplied by the greater of the PB or contract value immediately after the partial surrender.

The contract owner may request an amount less than, equal to, or greater than the lifetime benefit payment. Total partial surrenders taken during a contract year on or after the contract anniversary immediately following the covered life's $60^{th}$ birthday (or other predetermined age) which exceed the LBP may reduce future LBP values and may reduce the PB. If the total amount requested by the contract owner during a contract year is less than the lifetime benefit payment, the excess cannot be carried over to increase future years' lifetime benefit payments.

Option 2: The annuity product includes a series of payout periods, wherein the number of years in each payout period is predetermined (preferably five years, or other predetermined period), and wherein the number of years of each payout period is greater than one year. Each of the yearly lifetime benefit payment withdrawals during the given payout period is determined and a withdrawal percent is used for each given year, wherein the sum of the withdrawal percents from each given year within the given payout period is equal to or less than the predetermined maximum total withdrawal percent that is allowed for the given payout period.

In one embodiment, the yearly lifetime benefit payment withdrawals during the given payout period are determined by the following formulas:

LBP withdrawal(year 1)=(the Payment Base)×(the year 1 Withdrawal Percent), wherein (the year 1 Withdrawal Percent) is selected by the relevant life;

LBP withdrawal(year 2)=(the Payment Base)×(the year 2 Withdrawal Percent), wherein (the year 2 Withdrawal Percent) is selected by the relevant life;

LBP withdrawal(year $X$)=(the Payment Base)×(the year $X$ Withdrawal Percent), wherein (the year X Withdrawal Percent) is selected by the relevant life;

wherein X=(the number of years of the first payout period);

wherein [(the year 1 Withdrawal Percent)+(the year 2 Withdrawal Percent)+(the year $X$ Withdrawal Percent)] is equal to or less then (the maximum total Withdrawal Percent for the first payout period), wherein (the maximum total Withdrawal Percent for the first payout period)=(the predetermined yearly Withdrawal Percent at year 1)×(the number of years of the first payout period).

It is important to note that, in alternative embodiments, the maximum total withdrawal percent for a given payout period is not established by any specific formula, but rather is predetermined and is an arbitrary number. The above steps are repeated for each subsequent payment period.

The total withdrawal percent may be distributed for the given period between each year within the given period by taking a larger withdrawal percent in some years and a smaller withdrawal percent in others. The maximum total withdrawal percent for the given period may not be exceeded however.

In one embodiment, if the total amount requested by the contract owner during a given period is less than the predetermined maximum total withdrawal percent times the payment base, or is zero, the excess can be carried over to increase future periods of lifetime benefit payments. However, the excess withdrawal percent that was not used will be limited by the maximum total withdrawal percent for the next given period. Therefore, if in another embodiment, the remaining withdrawal percentages are carried over from one withdrawal period to the next. The company issuing the contract needs to pre-determine the fact that the withdrawal percentages are not only grouped within a withdrawal period, but also across withdrawal periods. For example, a maximum total withdrawal percent of 15% can be distributed over 3 years, but that the contract owner would also be able to take 30% over 6 years, not to exceed 15% within the first 3-year period. Thus, in this example, if a contract owner takes less than 15% in the first 3 years, then in the second 3-year period, the contract owner can take 30% less than the amount actually taken in the first 3 years.

Contingent Deferred Sales Charge (CDSC)—Free Up to the Amount of the LBP

If the LBP exceeds the actual withdrawal amount (AWA) on the most recent contract anniversary, any contingent deferred sales charge (CDSC) will be waived up to the LBP amount.

Death Benefit Before Annuity Commencement Date

For both single and joint/spousal election, a death benefit may be available on the death of any owner or annuitant. For joint/spousal election only, no death benefit will be available when a covered life is the beneficiary, and the beneficiary dies. The death benefit provision guarantees that upon death a death benefit (DB) will be paid equal to the greater of the death benefit or the contract value as of the date proof of death is received. The rider charge is not assessed on death.

When proof of death is processed, the contract will go into suspense mode. No charges will apply during that period. The amount available to be paid as a death benefit under the terms of the rider is a return of premium adjusted for subsequent premium payments and partial surrenders.

At rider effective date:
If the rider is effective on the contract issue date, then the DB equals the initial premium.

If the rider is effective after the Contract Issue Date, then the DB equals 100% of the dollar amount of the Contract Value on the Rider effective date, less any bonus payments paid into the contract by the company in the last 12 months.

When a subsequent premium payment is received, the DB will be increased by 100% of the dollar amount of the subsequent premium payment. If the withdrawal feature is revoked, all future withdrawals from the death benefit will be fully proportional as of the date it is revoked.

Whenever a partial surrender is made prior to the contract anniversary immediately following the covered life's $60^{th}$ birthday (or other predetermined age), the death benefit is reduced for an adjustment defined below.

For the "threshold" definition, see the definition described in the section entitled "Calculation of the Payment Base" supra.

For cumulative partial surrenders during each contract year that are equal to or less than the threshold, the adjustment is the dollar amount of the partial surrender. For any partial surrender that first causes cumulative partial surrenders during the contract year to exceed the threshold, the adjustment is the dollar amount of the partial surrender that does not exceed the threshold, and the adjustment for the remaining portion of the partial surrender is a factor. The factor is applied to the portion of the death benefit that exceeds the threshold. The factor is defined as follows:

$1-(A/(B-C))$ where

A=partial surrenders during the contract year in excess of the threshold;
B=contract value immediately prior to the partial surrender; and
C=the threshold less any prior partial surrenders during the contract year. If C results in a negative number, C becomes zero.

For partial surrenders during each contract year, where the sum of the prior partial surrenders in the year that are in excess of the threshold, the adjustment is a factor. The factor is applied to the adjusted death benefit immediately before the surrender. The factor is defined as follows:

$1-(A/B)$ where

A=the amount of the partial surrender;
B=contract value immediately prior to the partial surrender.

Whenever a partial surrender is made on or after the contract anniversary immediately following the covered life's $60^{th}$ birthday (or other predetermined age), the DB will be equal to the amount determined as follows:

If the total partial surrenders since the most recent contract anniversary are equal to or less than the current lifetime benefit payment (LBP), the DB becomes the DB immediately prior to the partial surrender, less the amount of partial surrender, less the amount of partial surrender paid out of the general account of the company.

If the total partial surrenders since the most recent contract anniversary are more than the current LBP, but all partial surrenders were paid under the Automatic Income RMD (AI RMD), the DB becomes the DB immediately prior to the partial surrender, less the amount of partial surrender, less the amount of partial surrender paid out of the general account of the company.

If the total partial surrenders since the most recent contract anniversary exceed the total current LBP and the AI RMD exception does not apply, the adjustment is the dollar amount of the partial surrender that does not exceed the LBP, and the adjustment for the remaining portion of the partial surrender is a factor. The factor for is applied to the portion of the Death benefit that exceeds the LBP. The factor is as follows:

$$1-(A/(B-C)) \text{ where}$$

A=partial surrenders during the contract year in excess of the LBP;
B=contract value immediately prior to the partial surrender.
C=LBP less any prior partial surrenders during the contract year. If C results in a negative number, C=0 (zero).

For partial surrenders during each contract year, where the sum of the prior partial surrenders in the year that are in excess of the current LBP, the adjustment is a factor. The factor for adjustments for partial surrenders for the DB is applied to the adjusted DB immediately before the surrender. The factor is as follows:

$$1-(A/B) \text{ where}$$

A=the amount of the partial surrender;
B=contract value immediately prior to the partial surrender.

Contract Value (CV) Reduces Below Minimum Account Rules

The minimum contract value rules are an optional feature of the present invention and do not apply to the preferred embodiments. If the minimum contract value rules are selected to be applied, then the following rules are used. The minimum contract value (MCV) is defined as 20% or other predetermined percentage of the payment base on the date of a withdrawal request. Lifetime benefit payments cannot reduce the contract value below this minimum threshold. Only sub-account performance and withdrawals in excess of the LBP can decrease the contract value below the MCV.

If total partial surrenders since the most recent contract anniversary are less than or equal to the difference between the contract value and the MCV, the contract value will be reduced by the total partial surrender.
If the contract Value at the time of a partial surrender is less than or equal to the MCV, the contract value will not be decreased for the partial surrender. The requested partial surrender will be paid out of the general account assets of the company.
If the contract value immediately before the partial surrender is greater than the MCV, but would drop below the MCV after the partial surrender, the contract value will be liquidated to pay the LBP only to the extent it would equal the MCV. The remaining portion of the LBP that is not funded by the contract value will be paid out of the general account assets of the company.

Covered Life Change(s)—Single Life Elections

Any contractual change before the annuity commencement date (ACD) which causes a change in the covered life will result in a reset in the benefits provided under the rider, and fund allocation restrictions may be imposed.

Covered life changes in the first 6 months of the contract issue date (or during another time period) will not cause a change in the DB or PB. However, the WP and LBP may change based on the attained age of the oldest covered life after the covered life change.

If the covered life is changed and a withdrawal has been taken, both within the first 6 months from contract issue date (or during another time period), then the LBP and WP will be calculated at the time of the covered life change and will be based on the new covered life's attained age on the rider effective date.

If the covered life is changed and a withdrawal has not been taken, both within the first 6 months from contract issue date (or during another time period), then the LBP and WP will be calculated upon the first withdrawal:

If the first withdrawal is after the first 6 months and before the first contract anniversary (or during another time period), then the LBP and WP will be based on the new covered life's attained age on the rider effective date.

If the first withdrawal occurs after the first contract anniversary, then the LBP and WP will be calculated based on the new covered life's attained age on the most recently attained contract anniversary.

If the oldest covered life after the change is greater than the age limitation of the rider at the time of the change, then the rider will terminate, and the death benefit will be equal to contract value.

Covered Life Changes—Single Life Election:

Covered life changes after the first 6 months of contract issue date will cause a reset in the benefits. If the oldest covered life after the change is equal to or less than the age limitation of the rider at the time of the change, then either below will automatically apply.

If the rider is not currently available for sale, the withdrawal feature of the rider will be revoked.
The existing rider will continue with respect to the death benefit only.
The death benefit will be recalculated to the lesser of contract value or the DB on the effective date of the covered life change.
The rider charge will be assessed on the revocation date, and then will no longer be assessed.

If the rider is currently available for sale, the existing rider will continue with respect to all benefits, at the current contract rider charge.
The PB amount will be reset to the minimum of the contract value or the PB on the date of the change.
The DB will be reset to the minimum of the contract value or the DB on the date of the change
The WP and LBP will be recalculated on the date of the change, and will be based upon the following.
A. If withdrawals are taken prior to the first contract anniversary, a new covered life's attained age on the rider effective date will be used.
B. If withdrawals are taken after the first contract anniversary, the new covered life's attained age on the contract anniversary prior to the first withdrawal will be used.
The maximum contract value will be recalculated to equal the contact value on the date of the covered life change.

If the oldest covered life after the change is greater than the age limitation of the rider at the time of the change, the rider will terminate, and the DB will be equal to the contract value. If the rider is no longer available for sale and the issue age has changed the rider (to be determined on a non-discriminatory basis), and a covered life change occurs, and they exceed that newly determined age limitation, then rider will terminate, and the death benefit will be equal to contract value.

Covered Life Change(s)—Joint Life Elections

Covered life changes after the first 6 months of contract issue date, if owner and owner's spouse are no longer married, for reasons other than death, then covered life changes may occur as follows:

If surrenders have not been taken from the contract, then the PB, the DB and the MCV remain the same; covered life will be reset and the WP scale will be based on the youngest covered life as of the date of the change. Additionally, the following covered life changes may occur.

Owner may remove spouse as covered life.

Owner may remove spouse as a covered life and replace original spouse with new spouse. (These changes do not have to happen on the same day.)

If surrenders have been taken from the contract, then the following covered life changes may occur.

Owner may remove spouse as covered life.

The PB, the DB and the MCV remain the same.

The WP scale will be based on the attained age of the remaining covered life as of the date of the change.

Any changes other than removing the spouse will follow the rules of below.

If the oldest covered life after the change is greater than (older) to the age limitation of the rider at the time of the change, then the rider will terminate. The death benefit will be equal to contract value.

If any other contractual change causes a change in the covered life, then either will automatically apply:

If the oldest covered life after the change is equal to or less than (younger) the age limitation of the rider at the time of the change, then the withdrawal feature of this rider will be revoked. The existing rider will continue with respect to the death benefit only. The rider charge is assessed on revocation date, and then will no longer be assessed.

If the oldest covered life after the change is greater than (older) the age limitation of the rider at the time of the change, then the rider will terminate. The death benefit will be equal to contract value. If the rider is no longer available for sale and the issue age of the rider has been changed (to be determined on a non-discriminatory basis), and a covered life change occurs, and they exceed that newly determined age limitation, then rider will terminate, and the death benefit will be equal to contract value.

If the spouse dies and is the primary beneficiary and the covered life, then the owner may remove them from the contract. The PB, DB and MCV will remain the same. The WP will be recalculated as follows:

If there has been a partial surrender since the rider effective date, then WP will remain at the current percentage.

If there has not been a partial surrender since the rider effective date, then WP be based on the attained age of the remaining covered life on the contract anniversary prior to the first surrender.

Spousal Continuation
Single Life Election:

In the event the contract owner dies and spousal continuation is elected, the contract value will increase to the DB value (the greater of the contract value and the DB). The covered life will be re-determined on the date of the continuation. If the covered life is less than age 81 (or other predetermined age) at the time of the continuation, then either of the following will automatically apply:

If the rider is not currently available for sale, the withdrawal feature of the rider will be revoked. The existing rider will continue with respect to the death benefit only (i.e., the withdrawal feature will terminate). The rider charge is not assessed on the revocation date, and then no longer assessed.

If the rider is currently available for sale, the existing rider will continue with respect to all benefits at the current contract rider charge. The payment base and the death benefit will be set equal to the contract value on the continuation date. The LBP and WP will be recalculated on the continuation date. The WP will be recalculated based on the age of the oldest covered life on the effective date of the spousal continuation. If the WP had previously been locked in, then it will become unlocked and can change based on the next withdrawal. The maximum contract value will be set to contract value on the continuation date.

If the Covered Life is greater than or equal to age 81 (or another predetermined age) at the time of the continuation the Rider will terminate. The Death Benefit will be equal to Contract Value.

If the covered life is greater than or equal to 81 (or other predetermined age) at the time of the continuation, the rider will terminate. The death benefit will be equal to the contract value.

Joint/Spousal Continuation Election

In the event that the contract owner dies and spousal continuation is elected, the contract value will be increased to the DB value (the greater of the contract value and the DB). The spouse may do the following.

Continue the Contract and the Rider.

The existing rider will continue with respect to all benefits, at the current contract rider charge. The payment base will be equal to the greater of contract value or payment base on the continuation date. The LBP will be recalculated to equal the withdrawal percent multiplied by the greater of contract value or payment base on the continuation date. The maximum contract value will be the greater of payment base or contract value on the continuation date. The DB will be equal to the bumped up contract value on the continuation date.

The WP recalculation rule:

The WP will remain at the current percentage if there has been a partial surrender since the rider effective date.

If there has not been a partial surrender, the WP will be based on the attained age of the remaining covered life on the contract anniversary prior to the first surrender/withdrawal.

The contract owner can not name a new owner on the contract. The contract owner can name a new beneficiary on the contract. Any new beneficiary added to the contract will not be taken into consideration as a covered life. The rider will terminate upon the death of the surviving covered life.

Continue the Contract and Revoke the Withdrawal Feature of the Rider.

The charge is assessed on revocation date, and then no longer assessed. The covered life will be re-determined on the date of the continuation date for death benefit purposes. If the covered life is greater than the age limitation at the time of continuation, the rider will terminate. The death benefit will be equal to contract value.

Effect of Death of Owner or Annuitant Before the Annuity Commencement Date.

The following tables describe the effect of the death of the owner or annuitant before the annuity commencement date.

TABLE 1

Single Life Election

| If the Deceased is | And... | And... | Then the... |
|---|---|---|---|
| Contract Owner | There is a surviving contract owner | The annuitant is living or deceased | Joint contract owner receives the DB, Rider terminates |
| Contract Owner | There is no surviving Contract Owner | The annuitant is living or deceased | Rider terminates Designated Beneficiary receives DB |

TABLE 1-continued

Single Life Election

| If the Deceased is | And... | And... | Then the... |
|---|---|---|---|
| Contract Owner | There is no surviving Contract Owner or Beneficiary | The annuitant is living or deceased | Rider terminates Estate receives DB |
| Annuitant | Contract Owner is living | There is no contingent annuitant and the contract owner becomes the contingent annuitant | Contract continues, no DB is paid, Rider continues |
| Annuitant | Contract Owner is living | There is no contingent annuitant and the contract owner waives their right become the contingent annuitant | Rider terminates, contract owner receives DB |
| Annuitant | Contract Owner is living | contingent annuitant is living | Contingent annuitant becomes annuitant and the contract and Rider continues |
| Annuitant | Contract Owner is non-natural person | There is no contingent annuitant | Contract owner receives DB, Rider terminates |

TABLE 2

Joint/Spousal Continuation Election
Contingent Annuitant becomes Annuitant
If the annuitant dies where there is a contingent annuitant (who is different from the owner/annuitant), then the rider continues and all provisions of the rider remain the same, there are no resets nor DBs paid. Upon the death of the last surviving covered life, a DB is paid to the beneficiary, and the rider terminates.

| If the Deceased is | And... | And... | Then the... |
|---|---|---|---|
| Contract Owner | There is a surviving contract owner | The annuitant is living or deceased | The surviving contract owner continues the contract and rider, increase the contract value to the death benefit value. |
| Contract Owner | There is no surviving contract owner | The annuitant is living or deceased | If the spouse is the sole primary beneficiary, follow spousal continuation rules for joint life elections |
| Contract Owner | There is no surviving contract owner or beneficiary | The annuitant is living or deceased | Rider terminates Estate receives DB |
| Annuitant | Contract owner is non-natural person | | If the spouse is the sole primary beneficiary, follow spousal continuation rules for joint life elections |
| Annuitant | The owner is living | There is a living contingent annuitant | The rider continues; upon the death of the last surviving Covered Life, the rider will terminate. |

Effect of Death After the Annuity Commencement Date.

The following table describes the effect of death after the annuity commencement date.

TABLE 3

Single Life Election

| If the Deceased is | And... | And... | Then the... |
|---|---|---|---|
| Annuitant | The annuitant is also the contract owner | Fixed Lifetime and Period Certain is elected | The lifetime contingency ceases. The remaining DB is paid under Period Certain. |

TABLE 4

Joint/Spousal Continuation Election

| If the Deceased is... | And... | And... | Then the... |
|---|---|---|---|
| Annuitant | The annuitant is also the contract owner, and there is no surviving Joint Annuitant | Fixed Lifetime and Period Certain is elected | The lifetime benefit ceases. The remaining DB is paid under Period Certain. |
| Annuitant | The annuitant is also the contract owner, and there is a surviving Joint Annuitant | Fixed Joint and Survivor Lifetime and Period Certain is elected | Lifetime Benefit continues until death of last surviving annuitant |

Fund Allocation Restrictions

The right to restrict investment is reserved in any investment option in the case of a change of covered life after six months. If the investment option restriction is imposed, the contract owner has the following options:

Reallocate all existing money and all new premium to a non-restricted investment option, an available asset allocation program, or fund-of-fund investment option as may be offered from time to time.

Revoke the Withdrawal Feature.

If the restrictions are violated, the withdrawal feature will be revoked. The Death Benefit continues as is upon the date of revocation.

Aggregation

For purposes of determining the PB under the rider, one or more deferred variable annuity contracts issued with the rider attached in the same calendar year as one contract. If the contracts are aggregated, the period will change over which withdrawals are measured against the benefit payment.

The issuing company will treat the effective date of the election until the end of the calendar year as a contract year for the purposes of the LBP limit. A pro rata rider charge will be taken at the end of that calendar year. As long as total withdrawals in that period do not exceed the LBP, the withdrawals will not necessitate a reset.

In future calendar years, the LBP limits will be aggregated and will be on a calendar year basis. In other words, withdrawals under all aggregated contracts in a calendar year will be compared against the combined LBP limits for the aggregated contracts. If withdrawals exceed those combined limits, the aggregate PB will be set to the combined contract values of the aggregated contracts. The LBP will then equal withdrawal percent multiplied by the new PB.

If withdrawals do not exceed those combined limits, each withdrawal will reduce the PB dollar for dollar. The withdrawal benefits relating to the contract value reaching zero will not apply until the contract value of all aggregated contracts reaches zero.

The rider charge will be taken at the end of each calendar year. It will be deducted pro rata from all of the sub-accounts and fixed accounts of the aggregated contracts. If the contract values of all aggregated contracts are reduced below our minimum account rules in effect, the annuity options will be offered as defined earlier in this specification. The options will pay the combined LBP.

Annuity Commencement Date

If the annuity reaches the maximum ACD, which is the later of the $10^{th}$ contract anniversary and the date the annuitant reaches age 90, the contract must be annuitized unless it is agreed upon to extend the ACD. In this circumstance, the contract may be annuitized under standard annuitization rules, but under no circumstances will the amount payable be less than your LBP, provided that the certain period does not exceed the Death Benefit remaining at the ACD divided by the LBP.

Single Life Election:

Fixed lifetime and Period Certain Payout will be issued. The lifetime portion will be based on the Covered Life determined at ACD. The Covered Life is the Annuitant for this payout option. If there is more than one Covered Life, then the lifetime portion will be based on both Covered Lives. The Covered Lives will be the Annuitant and Joint Annuitant for this payout option. The lifetime portion will terminate on the first death of the two. The minimum amount paid to owner under this Annuity Option will at least equal the remaining DB under this rider.

If the oldest Annuitant is age 59 (or other predetermined age) or younger, the date the payments begin will be automatically deferred until the oldest Annuitant attains age 60 (or other predetermined age) and is eligible to receive payments in a fixed dollar amount until the later of the death of any Annuitant or a minimum number of years.

If the Annuitant(s) are alive and age 60 (or other predetermined age) or older, payments will be received in a fixed dollar amount until the later of the death of any Annuitant or a minimum number of years. The minimum number of years that payments will be made is equal to the remaining DB under this rider divided by the product of the payment base on the ACD multiplied by the greater of the WP and 5% Single (4½% Spousal).

$$\text{Single Election:} \quad \frac{DB}{PB \times \text{Max}(WP, 5\%)}$$

$$\text{Joint/Spousal Election:} \quad \frac{DB}{PB \times \text{Max}\left(WP, 4\frac{1}{2}\%\right)}$$

This annualized amount will be paid over the greater of the minimum number of years, or until the death of any Annuitant, in the frequency that is elected. The frequencies will be among those offered at that time but will be no less frequent than annually. If, at the death of any Annuitant, payments have been made for less than the minimum number of years, the remaining scheduled period certain payments will be made to the Beneficiary. A lump sum option is not available.

Joint/Spousal Continuation Election:

The minimum amount paid to owner under this Annuity Option will at least equal the DB under this rider. If the younger Annuitant is alive and age 59 (or other predetermined age) or younger, the date that payments begin will be automatically deferred until the younger Annuitant attains age 60 (or other predetermined age) and is eligible to receive payments in a fixed dollar amount until the death of the last surviving Annuitant or a minimum number of years.

If the Annuitants are alive and the younger Annuitant is age 60 or older (or other predetermined age), payments will be received in a fixed dollar amount until the death of the last surviving Annuitant or a minimum number of years. The minimum number of years that payments will be made is equal to the remaining DB under this rider divided by the LBP at annuitization. This annualized amount will be paid over the greater of the minimum number of years, or until the death of the last surviving Annuitant, in the frequency that is elected. The frequencies will be among those offered at that time but will be no less frequent than annually. If, at the death of the last surviving Annuitant, payments have been made for less than the minimum number of years, the remaining scheduled period certain payments will be made to the Beneficiary. A lump sum option is not available.

If both spouses are alive, the owner will be issued a Fixed Joint & Survivor Lifetime and Period Certain Payout. The Covered Life and Covered Life's spouse will be the Annuitant and Joint Annuitant for this payout option. The lifetime benefit will terminate on the last death of the two. If one spouse is alive, the owner will be issued a Fixed Lifetime and Period Certain Payout. The lifetime portion will be based on the Covered Life. The Covered Life is the Annuitant for this payout option. The lifetime benefit will terminate on the last death of the Covered Life.

Premium Restrictions

Prior company approval is required on all subsequent premium payments received after the first 12 months. The approval rules are as follows.

Any subsequent premium(s) will not be accepted if it brings the total cumulative subsequent premiums in excess of $100,000 without prior approval.

Revoking the Withdrawal Feature

In one embodiment, at any time following the earlier of Spousal Continuation or the fifth anniversary of the Rider effective date, the Contract Owner may elect to revoke the Withdrawal Feature of the Rider. The Payment Base will go to Zero and the Withdrawal Percent will go to Zero, and LBP will go to Zero.

On the date the withdrawal feature is revoked, a pro rata share of the Rider charge is equal to the Rider charge percentage multiplied by the PB, multiplied by the number days since the last charge was assessed, divided by 365. The Rider Charge will be assessed on revocation date, and then will no longer be assessed. The Death Benefit continues as is upon the date of the revocation. No other living benefit may be elected upon the revocation of the Withdrawal Feature.

In another embodiment, the Contract Owner can not elect to revoke the withdrawal Feature. The Withdrawal Feature can be revoked in certain circumstances.

Additional Annuity Contract(s) Rules

Additional terms of the contract(s) or rider(s) include the following. The benefits under the contract cannot be assigned. If the free look provision under the contract is exercised, the rider will terminate.

Subject to state approval, a rider will be made available on all currently available products issued on or after the date the rider is launched for sale in the state of issue. This does not imply post-issue election. Post-issue election will be determined on an as needed basis. See product requirements for a complete list.

If the rider effective date is after the contract issue date, then the period between the rider effective date and the next contract anniversary will constitute a contract year.

The employee gross-up is not considered premium for purposes of the payment base and death benefit. Payment enhancements are not considered premium for purposes of the payment base and death benefit. Front-end loads are not taken from the premium for purposes of the payment base and death benefit.

Turning now to the figures, FIG. 1 illustrates the manner in which a new annuity contract application is processed. The new application processing routine starts (block 102) when an application is completed. The annuity contract application and initial premium are received by the insurance company (block 104). The annuity contract is then established through the contract establishing routine (block 106) as further described in FIG. 2. After the annuity contract is established, the account value is then set up through the account value set routine (block 108), via the computer systems, as further specified in FIG. 3. Thereafter customer communication is established through the customer communication routine (block 110) as further specified in FIG. 4. The application processing routine ends at (block 112).

Figure 2:
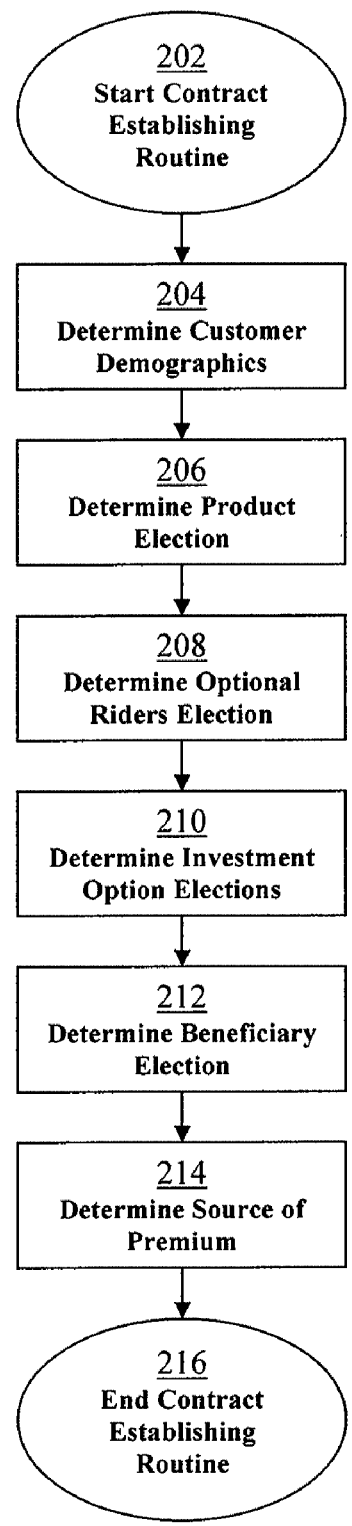
FIG. 2 is a flow chart that illustrates in more detail the manner in which an annuity contract is established.

FIG. 2 is a flow chart that illustrates in more detail the manner in which an annuity contract is established. The annuity contract establishing routine starts at (block 202). After receiving the annuity contract application, customer demographics are determined (block 204). The customer demographics and other data from the annuity contract application are transmitted to the insurance company by any suitable means, such as electronic transmission, facsimile transmission, telephonic transmission, and the like. The customer demographics may be scanned in or electronically entered into the computer system by the insurance company after the demographic data is determined. Such demographic information may include age, gender, date of birth, social security number, address, marital status, and the like. The customer demographics may be used for a variety of purposes, such as identification purposes or to locate a relevant life by searching his/her social security number. The customer demographics are also used when determining and/or calculating a variety of factors that are related to the annuity contract, such as benefit amount calculations, tax considerations, and the like. The types of customer demographics that are determined are generally related to the type of annuity contract application that is filled out by the relevant life. The specific product election is determined (block 206). For example, the specific product may be elected from a group of different variable annuity products which each have different characteristics including the costs and fees as well as the liquidity features associated therewith. The election of optional riders is determined (block 208). For example, the optional riders may be elected from a group of different riders which each have various guaranteed withdrawal features. The election of investment options is determined (block 210). For example, the investment options include money market funds, bond funds, stock funds, and the like. The beneficiary is elected (block 212). In one aspect, this is the person who will collect the death benefits, if any. The source of the premium is determined (block 214). For example, the source of the premium may come from the relevant life's personal funds or may come from another annuity in the form of a transfer. It should be understood that the steps taken for establishing the contract may proceed in various orders and that the order shown in FIG. 2 is for illustrative purposes only and is only one embodiment of said steps. The contract establishing routine ends at (block 216).

Figure 3:
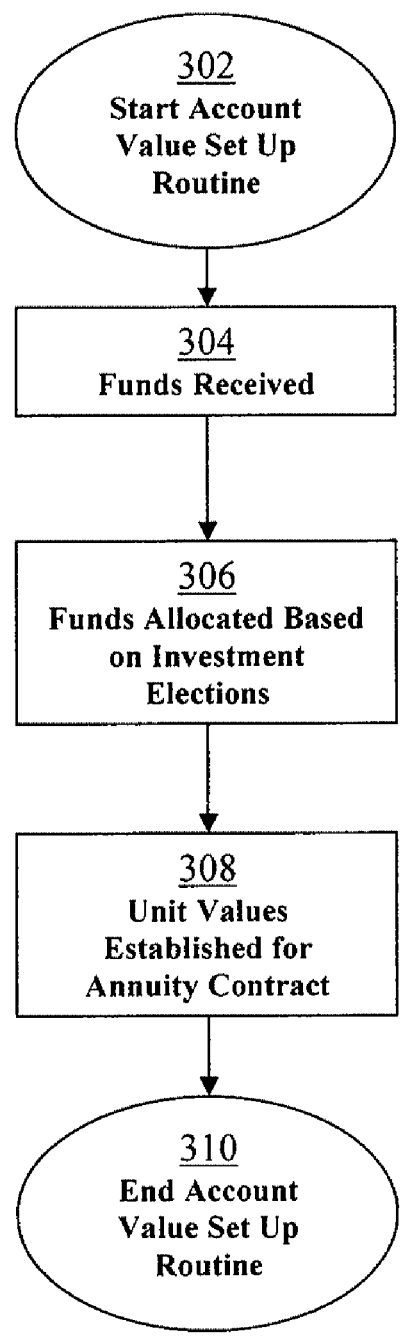
FIG. 3 is a flow chart that illustrates in more detail the manner in which an account value is set up.

FIG. 3 is a flow chart that illustrates in more detail the manner in which an account value is set up. The account value set up routine starts at (block 302). The funds are received (block 304). For example, the funds may be received via electronic transfer from a bank account or from another variable annuity holder. The funds are then allocated based on investment elections (block 306). For example, the allocations can be accomplished through a computerized system according to the investment elections by the relevant life. Unit values are established for the annuity contract (block 308). For example, based on the performance of the underlying investment elections, unit values are established, preferably on a daily basis, for use in determining the resulting impact on the relevant life's annuity contract based on their specific fund allocations. For example the number of units that are applied to each annuity contract is different for each relevant life based on the number of units held within the annuity contract. It should be understood that the steps taken for setting up the account value may proceed in various orders and that the order shown in FIG. 3 is for illustrative purposes only and is only one embodiment of said steps. The account value set up routine ends at (block 310).

Figure 4:
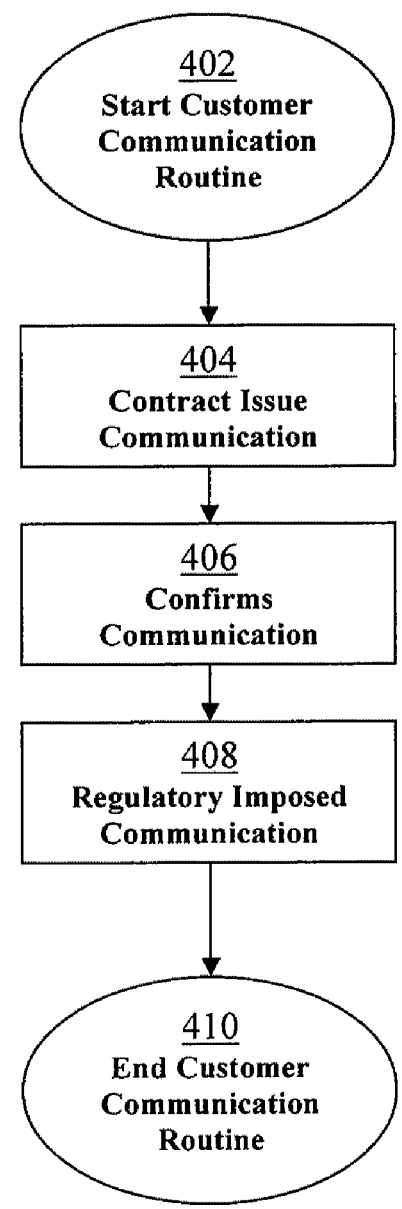
FIG. 4 is a flow chart that illustrates in more detail the manner in which customer communication is established.

FIG. 4 is a flow chart that illustrates in more detail the manner in which customer communication is established. The customer communication routine starts at (block 402). Communications with the customer may be accomplished via email, facsimile, letter, telephone, and the like. Communication with the customer in one aspect relates to the issuing of the contract (block 404). Communication with the customer in one aspect relates to the relevant confirmation of the previous contract issuance communication (block 406). Any regulatory-imposed communication with the client is accomplished (block 408). It should be understood that the steps taken for establishing customer communication may proceed in various orders and that the order shown in FIG. 4 is for illustrative purposes only and is only one embodiment of said steps. The customer communication routine ends at (block 410).

Figure 5:
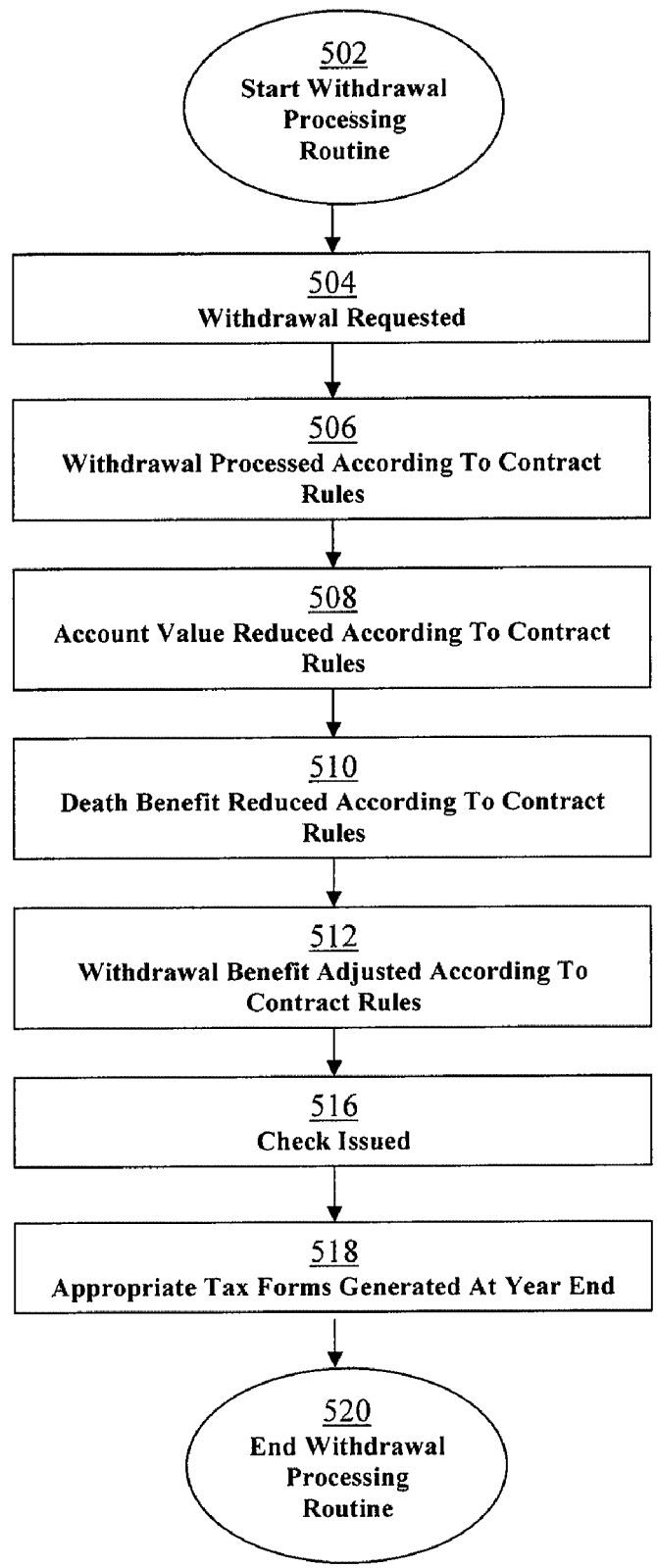
FIG. 5 is a flow chart illustrating the appropriate steps after a withdrawal is requested.

FIG. 5 is a flow chart illustrating the appropriate steps after a withdrawal is requested. The withdrawal processing routine starts at (block 502). A withdrawal is first requested by the relevant life at (block 504). The withdrawal is then processed according to the contract rules (block 506). The contract rules are embedded in a computer system or the like and vary according to the type of annuity contract. For example, in certain embodiments, a requested withdrawal amount by the relevant life may be limited by the contract rules to a specific withdrawal percent that is applied by the computer system, and wherein the contract rules specify the withdrawal percent according to the age of the relevant life or the number of years since the contract was established. Therefore, the contract rules govern the data flow in the computer system. The contract rules are administratively built into the computer system to obviate the need for manual intervention by the insurance company. The account value is reduced according to the contract rules (block 508). The death benefit is reduced according to the contract rules (block 510). The withdrawal benefit is adjusted according to the contract rules (block 512). The check or other form of payment is issued (block 516). The appropriate tax forms are generated at year end (block 518). It should be understood that the steps taken for processing withdrawals may proceed in various orders and that the order shown in FIG. 5 is for illustrative purposes only and is only one embodiment of said steps. The withdrawal processing routine ends at (block 520).

Figure 6:
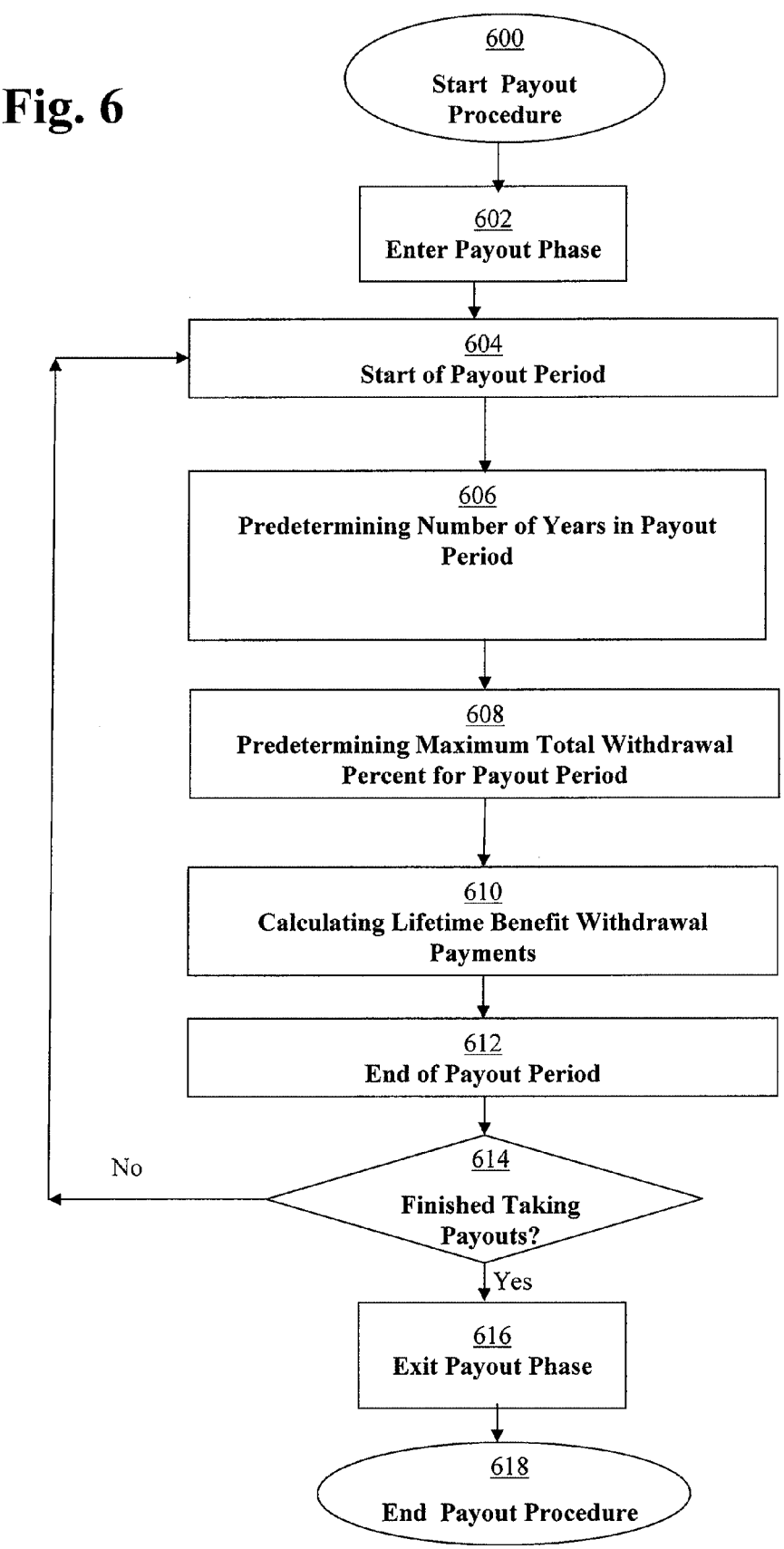
FIG. 6 is a flow chart illustrating an embodiment of the present invention comprising a data processing method for administering an annuity contract for a relevant life.

FIG. 6 is a flow chart illustrating a preferred embodiment of the present invention comprising a data processing method for administering a deferred annuity contract for a relevant life. It should be understood that the order of the successive method steps in each Figure herein is shown for the sake of illustrating but one example, with that said, the order of method steps can proceed in any variety of orders. In one embodiment of the present invention, the invention comprises a data processing method for administering a deferred annuity contract during the accumulation phase for a relevant life, the annuity product having a payment base, a contract value and yearly lifetime benefit payments.

Upon a triggering event, the payout procedure begins (block 600) and the method enters the payout phase (block 602) of the annuity contract. Such a triggering event may be a predetermined date or expiration of a set time period, preferably set by the company issuing the annuity. Alternatively, the triggering event may be the election of the relevant life to begin withdrawing payouts or receiving lifetime benefit payments. It should be understood that an annuity contract of the present invention preferably has a single payout phase with one or more payout periods within the payout phase.

The number of payout periods within the payout phase will vary and may depend on such factors as: the age of the relevant life at the start of the payout phase, the contract value at the start of the payout phase, the payment base at the start of the payout phase, the performance of the underlying investments during the payout phase, and the like. Upon entering the payout phase (602), the present method continues on to the start of a (first) payout period (block 604). The present method determines the number of years of a given payout period for the lifetime benefit payments, wherein the number of years of the first payout period is greater than one year (block 606).

The present method determines the maximum total withdrawal percent for a given payout period (block 605). If requested by the relevant life and the covered life is older than a predetermined age (i.e. 60 years old), the present method periodically calculates a yearly lifetime benefit payment for the relevant life (block 610), which decreases the contract value. The amount of the lifetime benefit payment withdrawal for each given year within the given payout period is determined by receiving an instruction from the relevant life that provides a withdrawal percent to use for each given year, wherein the sum of the withdrawal percents from each given year within the given payout period, as provided by the relevant life's instructions, is equal to or less than the predetermined maximum total withdrawal percent that is allowed for the given payout period.

The withdrawal percents provided by the relevant life's instructions may differ for each given year within the first payout period. After the end of each given payout period (block 612), the method determines whether the relevant life is finished taking payouts (block 614). If the relevant life is not finished taking payouts, then the method repeats the above method steps for the next payout period. If the relevant life is finished taking payouts, then the method exits the payout phase (block 616), and the payout procedure ends (block 618). It should be understood that there are several situations that could lead to a relevant life being finished with taking payouts during the payout phase. Such reasons may include: the contract value has reached a minimum value, if any, or has reached zero, the relevant life has died, the relevant life has chosen to annuitize the contract, and the like.

Figure 7:
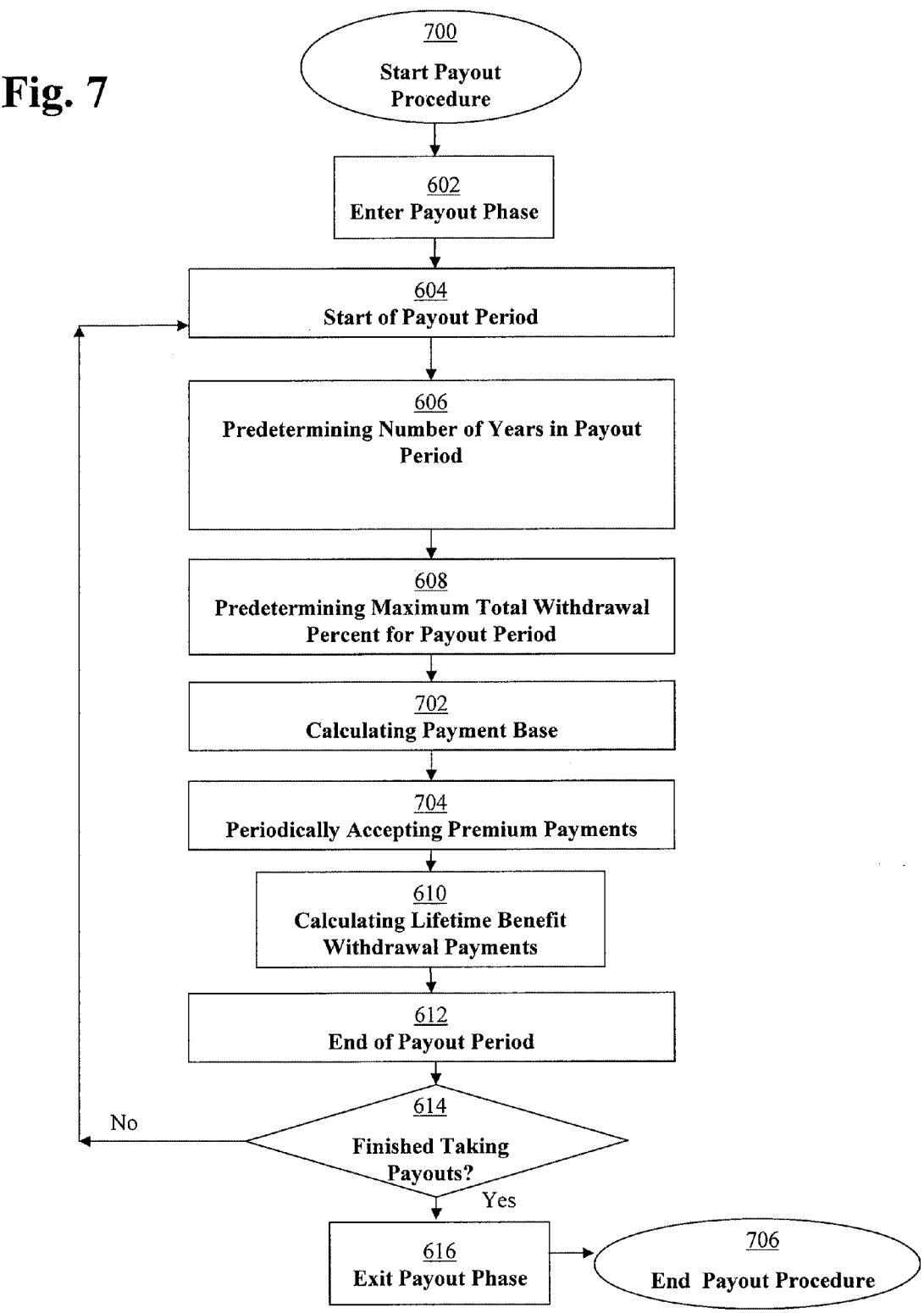
FIG. 7 is a flow chart illustrating an embodiment of the present invention comprising a data processing method for administering a deferred annuity product for a relevant life.

FIG. 7 is a flow chart illustrating an alternative embodiment of the present invention comprising a data processing method for administering a deferred annuity contract for a relevant life. Upon a triggering event, the payout procedure begins (block 700) and the method enters the payout phase (block 602) of the annuity contract. After entering the payout phase (block 602), the method continues on to the start of a (first) payout period (block 604). The present method determines the number of years of a given payout period for the lifetime benefit payments, wherein the number of years of the first payout period is greater than one year (block 606).

The present method determines the maximum total withdrawal percent for a given payout period (block 608). The method calculates a payment base for the annuity product, which is a function of the previous premium payments made by the relevant life (block 702). If requested by the relevant life, the method periodically accepts premium payments from the relevant life, which increase the payment base and the contract value (block 704). If requested by the relevant life and the covered life is older than a predetermined age (i.e. 60 years old), the present method periodically calculates a yearly lifetime benefit payment for the relevant life (block 610), which decreases the contract value.

The amount of the lifetime benefit payment withdrawal for each given year within the given payout period is determined by receiving an instruction from the relevant life that provides a withdrawal percent to use for each given year, wherein the sum of the withdrawal percents from each given year within the given payout period, as provided by the relevant life's instructions, is equal to or less than the predetermined maximum total withdrawal percent that is allowed for the given payout period. The withdrawal percents provided by the relevant life's instructions may differ for each given year within the first payout period.

After the end of each given payout period (block 612), the method determines whether the relevant life is finished taking payouts (block 614). If the relevant life is not finished taking payouts, then the method repeats the above method steps for the next payout period. If the relevant life is finished taking payouts, then the method exits the payout phase (block 616) and the payout procedure ends (block 706).

In one embodiment, each of the yearly lifetime benefit payment withdrawals during the given payout period are determined by the following formulas:

$$\text{LBP withdrawal(year 1)} = \text{(the Payment Base)} \times \text{(the year 1 Withdrawal Percent)},$$

wherein (the year 1 Withdrawal Percent) is selected by the relevant life;

$$\text{LBP withdrawal(year 2)} = \text{(the Payment Base)} \times \text{(the year 2 Withdrawal Percent)},$$

wherein (the year 2 Withdrawal Percent) is selected by the relevant life;

$$\text{LBP withdrawal(year } X) = \text{(the Payment Base)} \times \text{(the year } X \text{ Withdrawal Percent)},$$

wherein (the year X Withdrawal Percent) is selected by the relevant life; wherein X=(the number of years of the given payout period);

wherein [(the year 1 Withdrawal Percent)+(the year 2 Withdrawal Percent)+ . . . +(the year X Withdrawal Percent)] is equal to or less then (the maximum total Withdrawal Percent for the given payout period), wherein (the total Withdrawal Percent for the given payout period) is preferably predetermined by the company issuing the annuity product. It is important to note that, in alternative embodiments, the total Withdrawal Percent for a given payout period is not established by any specific formula, but rather is predetermined and is an arbitrary number.

Figure 8:
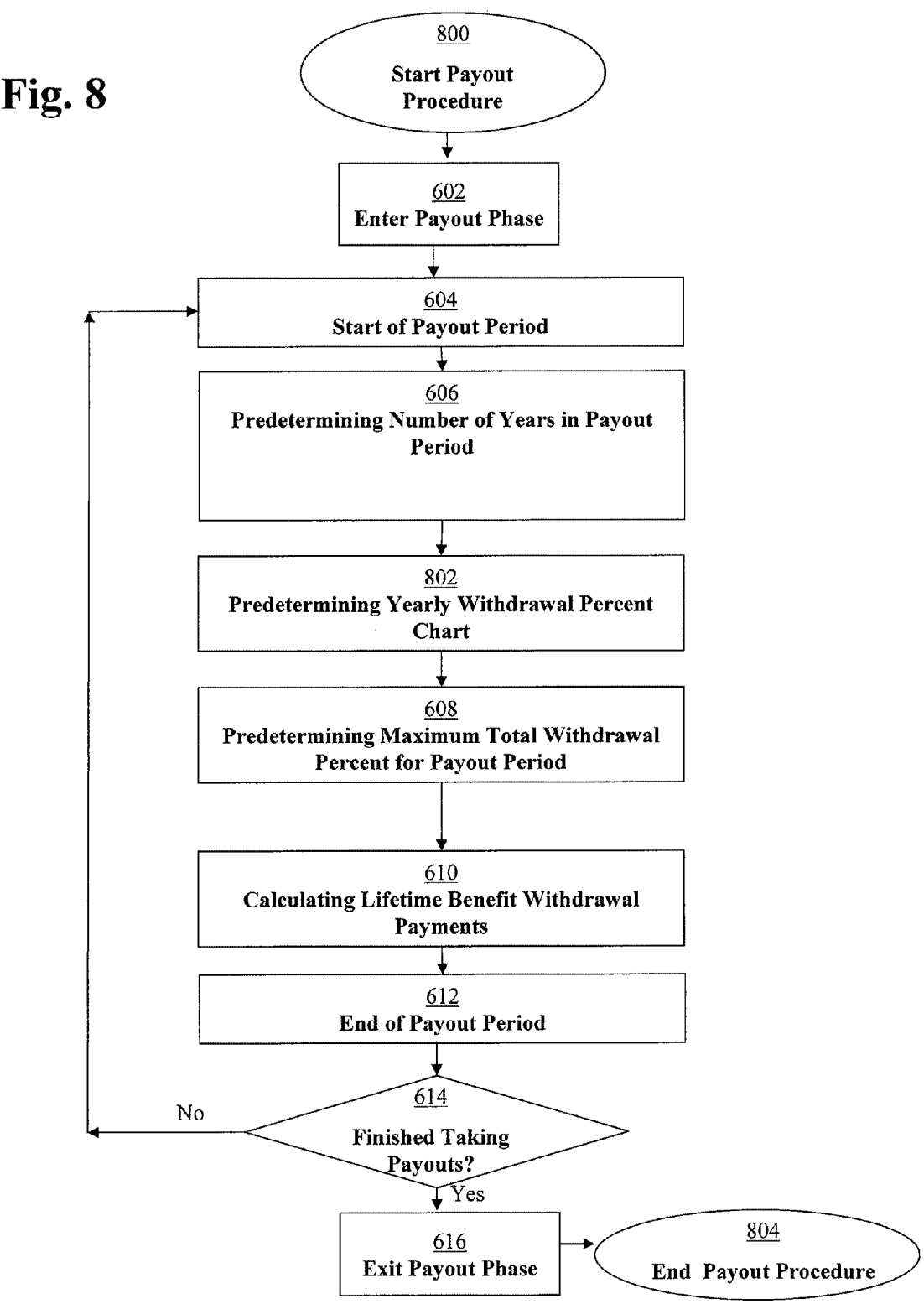
FIG. 8 is a flow chart illustrating an embodiment of the present invention comprising a data processing method for administering a deferred annuity product for a relevant life.

FIG. 8 is a flow chart illustrating an alternative embodiment of the present invention comprising a data processing method for administering a deferred annuity contract for a relevant life. Upon a triggering event, the payout procedure begins (block 800) and the method enters the payout phase (block 602) of the annuity contract. After entering the payout phase (block 602) the method continues on to the start of a (first) payout period (block 604). The present method determines the number of years of a given payout period for the lifetime benefit payments, wherein the number of years of the first payout period is greater than one year (block 606).

The present method predetermines a yearly withdrawal percent chart, which provides a withdrawal percent for each year of the relevant life's future age (block 802). The present method determines the maximum total withdrawal percent for a given payout period (block 608). If requested by the relevant life and the covered life is older than a predetermined age (i.e. 60 years old), the present method periodically calculates a yearly lifetime benefit payment for the relevant life (block 610), which decreases the contract value.

The amount of the lifetime benefit payment withdrawal for each given year within the given payout period is determined by receiving an instruction from the relevant life, which provides a withdrawal percent to use for each given year, wherein the sum of the withdrawal percents from each given year within the given payout period, as provided by the relevant life's instructions, is equal to or less than the predetermined maximum total withdrawal percent that is allowed for the given payout period.

The withdrawal percents provided by the relevant life's instructions may differ for each given year within the first payout period. After the end of each given payout period (block 612), the method determines whether the relevant life is finished taking payouts (block 614). If the relevant life is not finished taking payouts, then the method repeats the above method steps for the next payout period. If the relevant life is finished taking payouts, then the method exits the payout phase (block 616) and the payout procedure ends (block 804).

In this embodiment, the maximum total withdrawal percent for the given payout period is calculated using the following formula: (the maximum total Withdrawal Percent for the given payout period)=(the predetermined yearly Withdrawal Percent at the first year of the given payout period according to the withdrawal percent chart)×(the number of years of the given payout period).

Figure 9:
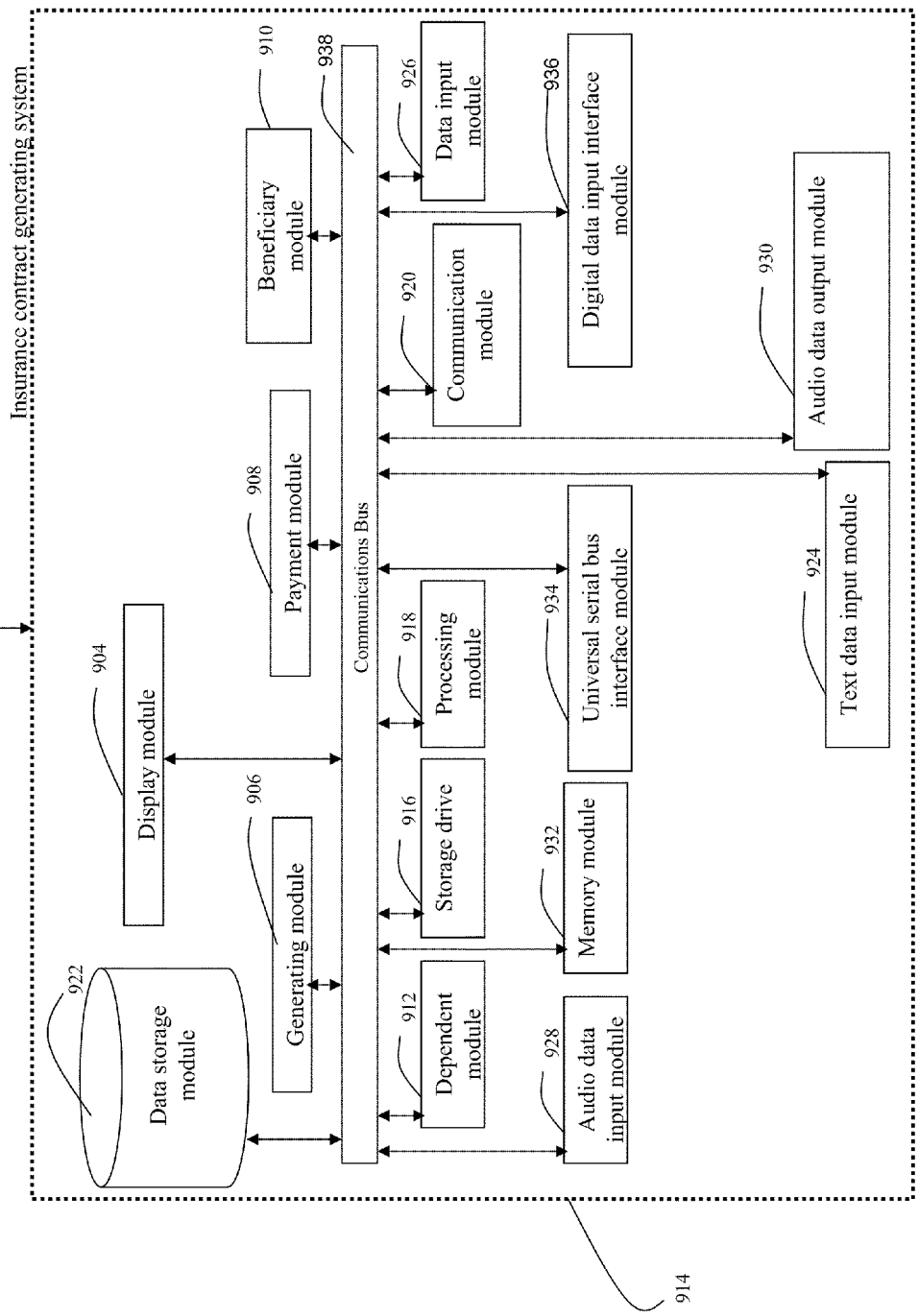
FIG. 9 is a diagram illustrating the system on which the methods of the present invention may be implemented in accordance with an embodiment of the present invention.

Referring next to FIG. 9, depicted is a preferred embodiment of a system on which the methods of the present invention may be implemented. In one example of the preferred embodiment, the insurance contract generating system 914 would generally be used by an insurance provider 902, however the system may be operated by any individual or organization offering an insurance product as outlined in the present specification without departing from the spirit of the present invention.

System 914 may be implemented in many different ways such as part of a single standalone server or as a network server or servers which may be distributed across multiple computing systems and architectures. Preferably, the central processing computer or network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server.

The network server may also be configured in a distributed architecture, wherein the server components or modules are housed in separate units or locations. Each of the modules described may be implemented as single servers or one or more or all of the modules may be incorporated into a single server. These servers will perform primary processing functions and contain at a minimum, a RAM, a ROM, and a general controller or processor. In such an embodiment, each server is connected to a communications hub or port that serves as a primary communication link with other servers, clients or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

In the preferred embodiment, all of the modules described herein are operably inter-connected via a central communications bus 938. The communications bus 938 is able to receive information from each of the modules, as well as to transmit information from one module to another. The insurance contract generating system 914 further includes a display module 904, and a generating module 906. The generating module is used for generating an insurance contract, wherein the insurance contract provides coverage to an individual or group for at least one event defined in the insurance contract.

The insurance contract generating system 914 additionally includes a payment module 908 for making payments to an insured individual or group for a predetermined period of time as defined by the deferred annuity insurance contract.

The system further comprises a beneficiary module 910 for choosing a beneficiary to receive payments from the insurance provider in the instance of an insured individual's death. Furthermore, the system comprises a dependent module 912 for offering an insurance contract structured according to the methods of the present invention to dependents of an individual eligible for the insurance contract described herein.

Additionally, the insurance contract generating system 914 includes: a storage drive 916 for receiving data stored on a storage disc, a processing module 918 for processing digital data received by and contained in the insurance contract generating system 914, a communication module 920 for bi-directional communication with external and telecommunications systems, a data storage module 922 for storing and managing digital information, a text data input module 924 for inputting data in the form of text, and a data input module 926 for converting to digital format documents and images and inputting them into the insurance contract generating system 914.

Finally, the insurance contract generating system 914 includes: an audio data input module 928 for receiving and inputting audio information, an audio data output module 930 for outputting data in audio format (i.e. recorded speech, synthetically generated speech from digital text, etc), a memory module 932 for temporarily storing information as it is being processed by the processing module 918, a universal serial bus interface module 934 for receiving and transmitting data to and from devices capable of establishing a universal serial bus connection, and a digital data input interface module 936 for receiving data contained in digital storage devices.

Data storage device may include a hard magnetic disk drive, tape, optical storage units, CD-ROM drives, or flash memory. Such data storage devices generally contain databases used in processing transactions and/or calculations in accordance with the present invention. In one embodiment, the database software creates and manages these databases. Insurance-related calculations and/or algorithms of the present invention are stored in storage device and executed by the CPU.

The data storage device may also store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, and each record includes fields that are specific to the present invention such as interest rates, contract value, payment base value, step up percent, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing a deferred annuity insurance contract to an individual, generating a deferred annuity insurance contract, and making payments to the individual as defined in the deferred annuity insurance contract. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EE-PROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem.

A communications device local to a computing device (or, e.g., a server) can receive the data on the respective communications line and place the data on a system bus for the processor. The system bus carries the data to main memory, from which the processor retrieves and executes the instructions. The instructions received by the main memory may optionally be stored in the memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

For example, a user provides instructions for the amount of the living benefit payment that is requested. It should be understood that the user may communicate with the computing system directly or indirectly through another party, such as the insurance provider 902. In the event the user communicates with an insurance provider 902, the insurance provider 902 than receives and transfers information, to and from the insurance contract generating system 914 via the text data input module 924, audio data input module 928, audio data output module 930 and the display module 904. For example, the relevant life may provide instructions to the insurance provider 902 indicating the withdrawal percent to use for each given year during the payout phase as described herein.

Furthermore, as used herein the data storage module 922 is also referred to as a storage device. The processing module 918 is contained within the insurance contract generating system 914, which is coupled to the storage device, the storage device stores instructions that are utilized by the processor. The instructions comprise: (i) an instruction for determining a series of payout periods, wherein the number of years of each payout period is greater than one year; (ii) an instruction for determining a maximum total withdrawal percent for each payout period; and (iii) an instruction for calculating the amount of the lifetime benefit payment withdrawal for each given year within a given payout period. Whereby the relevant life preferably provides a withdrawal percent to use for each given year, wherein the sum of the withdrawal percents from each given year with the payout period is equal to or less than the predetermined maximum total percent that is allowed for the given payout period.

Figure 10:
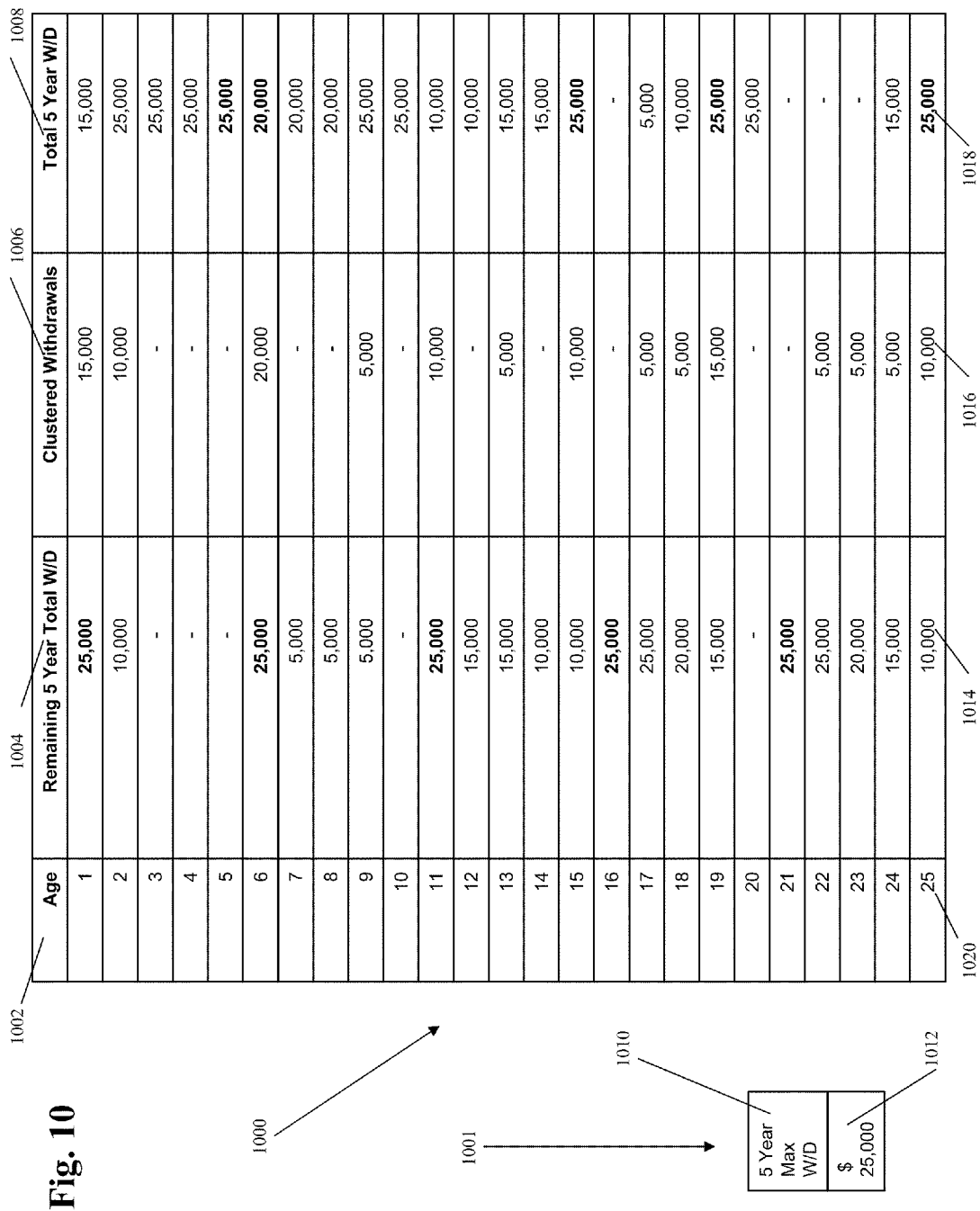
FIG. 10 depicts a table illustrating lifetime benefit payments issued to the relevant life for annuities associated with various ages in accordance with an embodiment of the present invention.

Turning now to FIG. 10, shown is table 1000, which illustrates exemplary lifetime benefit payments or clustered withdrawals 1016 paid to the relevant life, which are illustrated by "Clustered Withdrawals" column 1006. Furthermore, FIG. 10 includes supplemental table 1001, which indicates that the example illustrated by table 1000 contains a five-year maximum withdrawal time period 1010 as well as a maximum withdrawal amount 1012 throughout each five year period. For exemplary purposes, maximum withdrawal amount 1012 for each five year period is $25,000 and table 1000 contains five, five year periods.

Additionally, table 1000 includes "Remaining 5 Year Total W/D" column 1004, which illustrates the dollar value in terms of lifetime benefit payments or withdrawals 1014 that are entitled to the relevant life upon the end of the current year, whereby total remaining withdrawal 1014 is calculated by subtracting the previous clustered withdrawal 1016 from the previous total remaining withdrawal 1014. "Total 5 Year W/D" column 1008 tracks the total amount of withdrawals 1018 that are made by the relevant life throughout each five year period. "Age" column 1002 tracks the age 1020 of the relevant life throughout this example. As illustrated by table 1000, total remaining withdrawal 1014, clustered withdrawal 1016, and total amount of withdrawal 1018 all reset after each five year period.

For example, at Age 1, the total remaining withdrawal 1014 entitled to the relevant life is set at $25,000. The clustered withdrawal 1016 at age 1, which was arbitrarily selected for this example, is $15,000. Therefore, the total amount of withdrawals 1018 at this point is $15,000, which is correctly illustrated in "Total 5 Year W/D" column 1008. At age 2, the total remaining withdrawal that is currently available to the relevant life is now only $10,000. This value was calculated by utilizing the method as previously discussed above, in this example the current total remaining withdrawal is equal to $25,000 minus $15,000. At age 2, the clustered withdrawal 1016 is $10,000, which was once again arbitrarily chosen.

Figure 11:
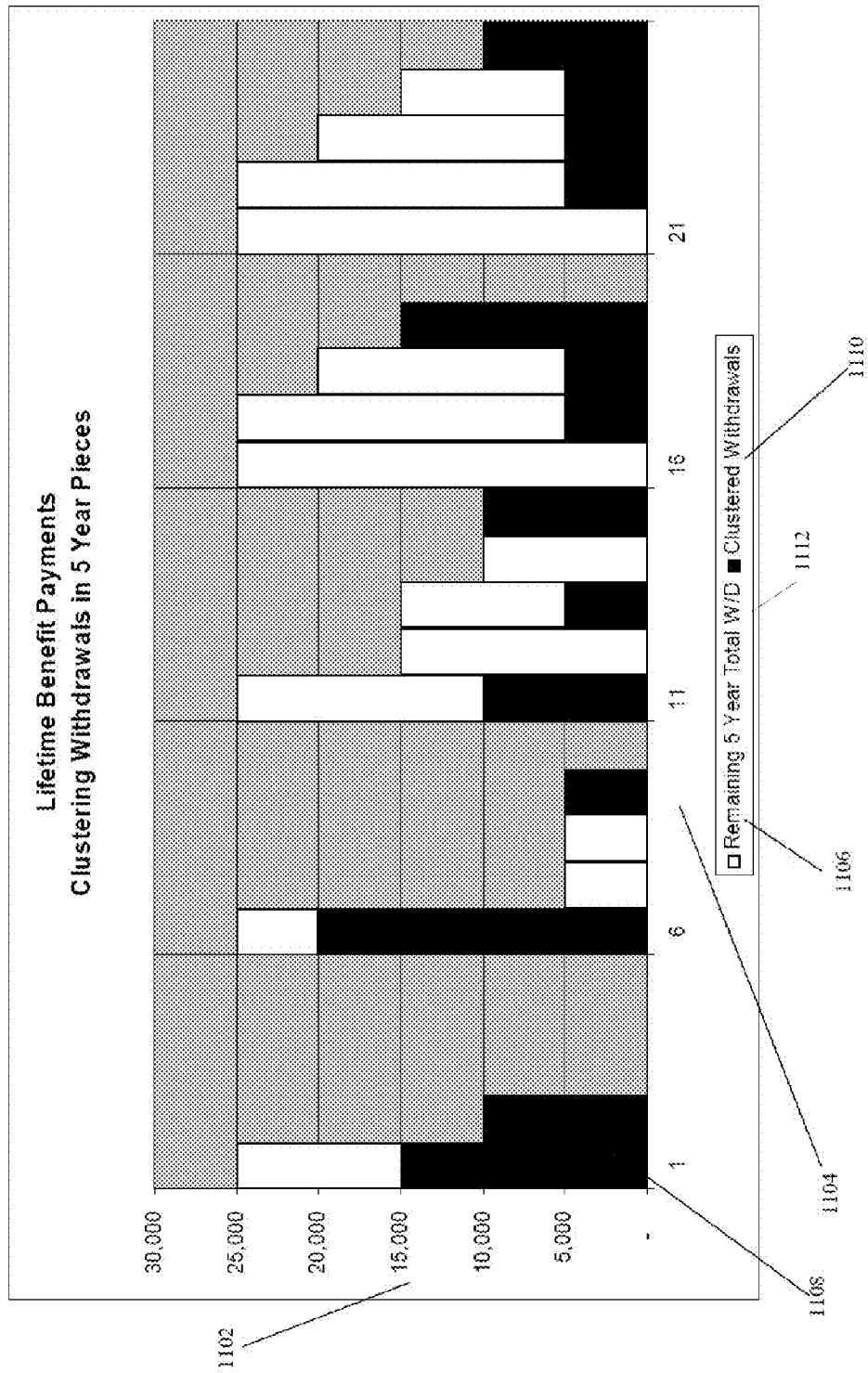
FIG. 11 depicts a graph illustrating lifetime benefit payments issued to the relevant life for annuities associated with various ages in accordance with an embodiment of the present invention.

Therefore, the total amount of lifetime benefit payments or withdrawals 1018 entitled to the relevant life has been exhausted at $25,000. Hence at age 3, the total remaining withdrawal 1014 for this specific five year period is now $0, which is represented in table 1000 with a "–" symbol. Additionally, the "–" symbol represents $0 and it is utilized throughout table 1000. The remaining five year periods represented by table 1000 all operate in a similar manner, but each period illustrates various exemplary withdrawals, which are used only to help FIG. 11 illustrates a graph 1100, titled "Lifetime Benefit Payments Clustering Withdrawals in 5 Year Pieces," which further illustrates the example represented by table 1000 of FIG. 10. More specifically, graph 1100 includes a lifetime benefit payment or withdrawal scale 1102, which illustrates withdrawal values 1110 as a function of age 1104 within five year pieces. The function of age 1104 is measured in years, but may be measured in other periods of time (days, weeks, months, decades, etc.) and is illustrated on the x-coordinate of graph 1100 so as to accurately correspond to table 1000 of FIG. 10.

Additionally, graph 1100 illustrates the total remaining withdrawal 1106 by utilizing white columns and the clustered withdrawals 1108 by utilizing dark columns, which is clearly indicated by the table key 1112. Essentially, graph 1100 visually illustrates the example represented within table 1000 of FIG. 10. For example, at age 1, the total remaining withdrawal 1106 illustrates a withdrawal value 1110 of $25,000, which directly corresponds with the total remaining withdrawal 1014 of table 1000 at age 1. Additionally, at age 1, the clustered withdrawal 1108 illustrates a withdrawal value 1110 of $15,000, which accurately corresponds with the clustered withdrawal 1016 of table 1000 at age 1.

It should be understood that several of the method steps of the present invention require a computer in order to be able to determine the respective values. In other words, a computer is required to use the method of the present invention; that is to say the calculations and appropriate data records must be accomplished by computer. For example, in one embodiment of the present invention, the payment base is related to premium payments by the relevant life. In one embodiment, the lifetime benefit payment is dependent on a selected withdrawal percentage. Although the method and system require an instruction from the relevant life for the withdrawal percent to use for each given year, the instruction does not have to come directly from the relevant life.

The instruction may come indirectly by going through the company issuing the contract or other third party or agent. In one embodiment, the predetermined withdrawal percent is based on the age of the relevant life at the time of the first requested lifetime benefit payment. As noted above, in alternative embodiments, the maximum total withdrawal percent for a given payout period may be established by a specific formula, or may be predetermined and is an arbitrary number for any given period.

The annuity commencement date is a date established according to rules, with certain restrictions. The initial guaranteed death benefit amount is determined in a similar fashion. Preferably, the initial guaranteed death benefit amount is set for calculation purposes. In a preferred embodiment, the initial guaranteed death benefit amount is equal to the payment base.

The lifetime benefit payment is paid periodically, such as yearly, quarterly, monthly, weekly, etc. The lifetime benefit payment withdrawal percent that is requested by the relevant life for a given year may be any amount greater than zero and equal to or less than the maximum total withdrawal percent remaining for the given payout period. The available lifetime benefit payment withdrawal percent that is remaining is determined at the start of each new year. However, the relevant life does not have to elect the highest possible available lifetime benefit payment at any given time. That is, the relevant life may choose how to "spread" the total withdrawal percent that is available for a given payout period between the individual years within the payout period. The value that is requested by the relevant life, if any, for the lifetime benefit payment for a given year will be subtracted from the contract value, but not from the payment base.

In a preferred embodiment, the relevant life may not request a yearly lifetime benefit payment withdrawal until after: (i) the expiration of a moratorium period, which is measured from the issue date of the contract; or (ii) the date the relevant life reaches age 60 (or other predetermined age), whichever is later. In one embodiment, such a moratorium period is five years. Any length of time may be selected for the moratorium period. Preferably, the predetermined yearly withdrawal percent is a function of the relevant life's age.

In one embodiment, once the first lifetime benefit payment withdrawal is taken, then that withdrawal percent is used to calculate the maximum total withdrawal percent that is available for a given payout period by multiplying that first withdrawal percent by the number of years in the payout period. In another embodiment, the withdrawal percent used to calculate the maximum total withdrawal percent available for a given payout period continues to rise with the relevant life's age, no matter if the relevant life has already begun to take lifetime benefit payments. In another embodiment, the withdrawal percent may either increase or decrease over the term of the annuity. Alternatively, the withdrawal percent may fluctuate over the term of the annuity.

It should be noted that the predetermined withdrawal percents for each year of the relevant life's future age is different than the withdrawal percent that is elected by the relevant life for any given year in any given payout period. As described above, the predetermined withdrawal percents are used in certain embodiments in order to calculate the maximum total withdrawal percent for any given payout period.

In a further embodiment, the present method further comprises the step of: periodically paying a withdrawal payment during a given payout period–that is in excess of: (the maximum total Withdrawal Percent for the given payout period)×

(the Payment Base)–to the relevant life from the contract value which decreases each of: the contract value and the payment base.

The lifetime benefit payment for any given year, if any, is paid in periodic installments throughout the given year, or alternatively, is paid in a single installment during the given year. The withdrawal percent used may fluctuate for each year during any given payout period according to the needs and/or preferences of the relevant life. The number of years in the payout period is in the range of 2 to 20 years, more preferably in the range of 3 to 10 years, and most preferably 5 years. In a preferred embodiment, the number of years of the first payout period for the lifetime benefit payments is the same as the number of years of each subsequent payout period, if any. The yearly predetermined withdrawal percent may be fixed; may increase at the beginning of each subsequent payout period; may decrease at the beginning of each subsequent payout period; or may fluctuate over the term of the annuity.

In a further embodiment, the present method further comprises the step of collecting a rider fee or collecting an account maintenance fee. In another embodiment, the present method further comprises the step of paying a death benefit to a beneficiary upon the death of the relevant life, wherein the death benefit is the greater of: (a) a predetermined guaranteed death benefit amount; and (b) the present contract value. Alternatively, the guaranteed death benefit is paid to the beneficiary only if the relevant life dies during the accumulation phase. Preferably, if the contract value reaches a predetermined minimum value, then the contract annuitizes and annuity payments commence. Preferably, the value of the annuity payments, if any, equals the value of the last guaranteed lifetime benefit payment.

In another embodiment, the present invention comprises a deferred annuity contract having yearly lifetime benefit payments, comprising: (i) means for predetermining a series of payout periods, wherein the number of years of each payout period is greater than one year; (ii) means for predetermining a maximum total withdrawal percent for each payout period; and (iii) means for calculating the amount of the lifetime benefit payment withdrawal for each given year within a given payout period by receiving an instruction from the relevant life that provides a withdrawal percent to use for each given year, wherein the sum of the withdrawal percents from each given year within the payout period is equal to or less than the predetermined maximum total withdrawal percent that is allowed for the given payout period.

In another embodiment, the present invention comprises a system for administering a deferred variable annuity contract during the accumulation phase, the annuity contract having a payment base, a contract value and yearly lifetime benefit payments, the improvement comprising: (i) administrative means for predetermining a series of payout periods, wherein the number of years of each payout period is greater than one year; (ii) administrative means for predetermining a maximum total withdrawal percent for each payout period; and (iii) administrative means for calculating the amount of the lifetime benefit payment withdrawal for each given year within a given payout period that provides a withdrawal percent to use for each given year, wherein the sum of the withdrawal percents from each given year within the payout period is equal to or less than the predetermined maximum total withdrawal percent that is allowed for the given payout period.

In another embodiment, the annuity product includes a step-up provision wherein the payment base is increased in response to positive performance of the underlying investments of the contract for a given period. Preferably, the step-up would take place at the beginning of each new payout period (e.g. every five years).

Other formulas may be utilized to determine the yearly lifetime benefit payment amount, wherein the withdrawal base is related to other values besides the payment base and/or the contract value.

The following description and examples further illustrate the preferred features of the present invention.

Preferably, there is a mandatory moratorium period, which is measured from the issue date of the contract. In one embodiment, the moratorium period is five years. The present method allows several years of withdrawal percents to be clustered together, and providing the enhanced flexibility to select a lifetime benefit payment amount based on the preferences and needs of the relevant life. The annuity contract has a series of payout periods, wherein each payout period has a maximum total withdrawal percent that may not be exceeded. Alternatively, the maximum total withdrawal percent for a given payout period may be exceeded if it is part of the multi-period withdrawal percentage total as described herein.

In one embodiment, the maximum total withdrawal percent for any given payout period is calculated as the first year's predetermined yearly withdrawal percent during the payout period times the number of years in the given payout period. It is important to note that, in alternative embodiments, the maximum total withdrawal percent for a given payout period is not established by any specific formula, but rather is predetermined and is an arbitrary number. For example, the maximum total withdrawal percent could be predetermined to be 15% over a three year payout period. In a preferred embodiment, the maximum predetermined yearly withdrawal percent is guaranteed at a predetermined percentage, for example about 10%.

Preferably, there is a maximum withdrawal percent for any given year, so that the relevant life cannot take the entire total withdrawal percent for the payout period in a single year. In another preferred embodiment, the maximum withdrawal in a given year is guaranteed at a value between 0% and the maximum withdrawal percent for the withdrawal period. For example, if someone withdraws 15% over three years, the maximum in any single year may be 10%. In another feature of the invention, any withdrawal percent amount that is not taken during a given payout period may be rolled into the next payout period, thereby increasing the available withdrawals for that payout period, if certain restrictions are met. In an alternative feature of the present invention, the product requires asset allocation constraints set by the company issuing the annuity product.

EXAMPLE 1

The following example illustrates one embodiment of the present method and system. The following starting parameters are set for the following example. Such starting parameters are strictly for the purposes of illustration. For example, the withdrawal percentage may be in the range of 0% to 100%, and more preferably in the range of 0% to 50%.

Certain starting parameters must be established prior to running the method of the present invention. In the following embodiments, a predetermined yearly withdrawal percent for each year of the relevant life's future age must be determined. For the purposes of illustration, the following values are used:

Yearly Withdrawal Percent for Each Year of the Relevant Life's Future Age:

5.0% for attained ages 60 to 64;
5.5% for attained ages 65 to 69;
6.0% for attained ages 70 to 74;
6.5% for attained ages 75 to 79; and
7.0% for attained ages 80 and above.

Next, the number of years in each payout period for the lifetime benefit payments must be determined, wherein the number of years of each payout period is greater than one year. For the purposes of illustration, each payout period is five years.

Using these starting parameters, below is an illustrative example of the present invention. For the purposes of illustration, the relevant life is 60 years old on Mar. 31, 1983. For purposes of illustration, the relevant life purchased the contract when he was 50 years old and the moratorium period requirement, if any, was satisfied. For the purposes of illustration, the value of the underlying funds within the contract remains flat. That is, the underlying funds of the contract do not exhibit growth or decline. This fact is merely for illustrative purposes of this example. In a typical example, the underlying funds of the variable annuity will show growth or decline from year to year, which will be factored in, together with any lifetime benefit payment for the given year, in calculating the contract value at the beginning of each year.

TABLE 5

First (5 year) payout period:
Maximum Total Withdrawal Percent for the first payout period =
5.0% × 5 years = 25.0%

| Age of Relevant Life | Period Ended | Premium Payment | Contract Value | Payment Base | Withdrawal Percent Selected | Guaranteed Lifetime Benefit Payment |
|---|---|---|---|---|---|---|
| 60 | Mar. 31, 1983 | 100,000 | 100,000 | 100,000 | 5.0% | 5,000 |
| 61 | Mar. 31, 1984 | — | 95,000 | 100,000 | 0% | 0 |
| 62 | Mar. 31, 1985 | — | 95,000 | 100,000 | 2.0% | 2,000 |
| 63 | Mar. 31, 1986 | — | 93,000 | 100,000 | 6.0% | 6,000 |
| 64 | Mar. 31, 1987 | — | 87,000 | 100,000 | 12.0% | 12,000 |

TABLE 6

Second (5 year) payout period:
Maximum Total Withdrawal Percent for the second payout period =
5.5% × 5 years = 27.5%

| Age of relevant life | Period Ended | Premium Payment | Contract Value | Payment Base | Withdrawal Percent Selected | Guaranteed Lifetime Benefit Payment |
|---|---|---|---|---|---|---|
| 65 | Mar. 31, 1988 | — | 75,000 | 100,000 | 9.0% | 9,000 |
| 66 | Mar. 31, 1989 | — | 66,000 | 100,000 | 0% | 0 |
| 67 | Mar. 31, 1990 | — | 66,000 | 100,000 | 0% | 0 |
| 68 | Mar. 31, 1991 | — | 66,000 | 100,000 | 16% | 16,000 |
| 69 | Mar. 31, 1992 | — | 50,000 | 100,000 | 2.5% | 2,500 |

TABLE 7

Third (5 year) payout period:
Maximum Total Withdrawal Percent for the third payout period =
6.0% × 5 years = 30.0%

| Age of relevant life | Period Ended | Premium Payment | Contract Value | Payment Base | Withdrawal Percent Selected | Guaranteed Lifetime Benefit Payment |
|---|---|---|---|---|---|---|
| 70 | Mar. 31, 1993 | — | 47,500 | 100,000 | 5.0% | 5,000 |
| 71 | Mar. 31, 1994 | — | 42,500 | 100,000 | 10.0% | 10,000 |
| 72 | Mar. 31, 1995 | — | 32,500 | 100,000 | 15.0% | 15,000 |
| 73 | Mar. 31, 1996 | — | 27,500 | 100,000 | 0 | 0 |
| 74 | Mar. 31, 1997 | — | 27,500 | 100,000 | 0 | 0 |

The following payout periods in this example will continue until the contract value reaches a predetermined minimum value, upon which time the contract will annuitize and annuity payments will commence. Preferably, the annuity payments will not begin until the present payout period has expired.

Having thus described the invention in rather full detail, it will be understood that such detail need not be strictly adhered to, but that additional changes and modifications may suggest themselves to one skilled in the art, all falling within the scope of the invention as defined by the subjoined claims.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for processing data associated with a deferred variable annuity contract during the accumulation phase, comprising:
   a data storage device storing data associated with the deferred variable annuity contract, including data indicative of a contract value, a payment base value, a duration greater than a year of a payout period, a withdrawal percent value for the payout period, and a formula for determining a value of benefit payments available during the payout period in accordance with a guarantee; and
   a processor in communication with the storage device, the processor configured to:
   responsive to receipt of data indicative of a request during the payout period by a relevant life for a withdrawal, determine a value of withdrawals during the payout period;
   compare the value of withdrawals during the payout period to the value of benefit payments available during the payout period; and
   responsive to a determination that the value of withdrawals during the payout period is not more than the value of benefit payments available during the payout period, provide an output signal having data indicative of a reduction in the contract value and no reduction in the payment base value as a result of the requested withdrawal.

2. The computer system of claim 1, wherein the processor is configured to determine the value of benefit payments available during the payout period by multiplying the payment base value by the withdrawal percent.

3. The computer system of claim 1, wherein the stored data comprises data indicative of durations greater than a year of a plurality of payout periods.

4. The computer system of claim 3, wherein each of the payout periods has a duration greater than a year.

5. The computer system of claim 1, wherein the stored data comprises data indicative of a plurality of payout periods having at least two different durations.

6. The computer system of claim 1, wherein the stored data further comprises a withdrawal percent value for a year during the payout period, the withdrawal percent value for the year during the payout period being less than the withdrawal percent value for the payout period.

7. The computer system of claim 6, wherein the processor is further configured to determine a value of withdrawals during the current year of the payout period, and, responsive to a determination that the value of withdrawals during the current year of the payout period is greater than a product of the withdrawal percent for the current year of the payout period and the payment base value, provide an output signal having data indicative of a reduction in the contract value and a reduction in the payment base value.

8. The computer system of claim 1, further comprising a payment module in communication with the processor for making withdrawal payments in accordance with instructions of a relevant life.

9. A computer-implemented data processing method for processing data associated with a deferred variable annuity contract during the accumulation phase, comprising:
   storing in a data storage device data associated with the deferred variable annuity contract, including data indicative of a contract value, a payment base value, a payout period duration greater than one year and a withdrawal percent value for the payout period;
   responsive to receipt by a processor in communication with the data storage device of data indicative of a request during the payout period by a relevant life for a withdrawal, determining by the processor a value of withdrawals during the payout period;
   comparing by the processor the value of withdrawals during the payout period to the value of benefit payments available during the payout period; and
   responsive to determining by the processor that the value of withdrawals during the payout period is not more than the value of benefit payments available during the payout period, providing by the processor an output signal having data indicative of a reduction in the contract value and no reduction in the payment base value as a result of the requested withdrawal.

10. The computer-implemented data processing method of claim 9, further comprising determining by the processor, based on multiplying the withdrawal percent value for the payout period by the payment base value, the value of benefit payments available during the payout period.

11. The computer-implemented data processing method of claim 9, wherein the withdrawal percent value for the payout period is equal to a product of a withdrawal percent value of one year during the payout period and a number of years of the payout period.

12. The computer-implemented data processing method of claim 9, wherein the withdrawal percent value for the payout period is equal to a sum of the withdrawal percent values of each year during the payout period.

13. The computer-implemented data processing method of claim 9, wherein the withdrawal percent value for the payout period is less than a sum of the withdrawal percent values of each year during the payout period, and the withdrawal percent value for each year in the payout period is less than the withdrawal percent value for the payout period.

14. The computer-implemented data processing method of claim 9, wherein the stored data comprises data indicative of a moratorium period from a date of the annuity contract until a commencement of a first payout period, no benefit payments being available during the moratorium period.

15. The computer-implemented data processing method of claim 9, further comprising, responsive to determining that the value of withdrawals during the payout period is greater than the value of benefit payments available during the payout period, providing by the processor an output signal having data indicative of a reduction in the contract value and a reduction in the payment base value.

16. A tangible computer-readable medium having processor-executable instructions stored thereon, which instructions, when executed by a processor, cause the processor to:
responsive to receipt of data indicative of a request by a relevant life for a withdrawal, during a current year of a multi-year payout period of the accumulation phase of a deferred variable annuity having a contract value, determine a value of withdrawals during the payout period and during the current year;
access data indicative of a maximum available withdrawal percent for the payout period, a withdrawal percent for the current year, and a payment base value of the annuity;
determine a maximum available benefit payment value for the payout period, and an available benefit payment value for the current year;
compare the value of withdrawals during the payout period to the maximum available benefit payment value for the payout period;
compare the value of withdrawals during the current year to the available benefit payment value for the current year, and
responsive to determining that the value of withdrawals during the payout period is not more than the maximum available benefit payment value for the payout period, and that the value of withdrawals during the current year is not more than the available benefit payment value for the current year, provide an output signal having data indicative of a reduction in the contract value and no reduction in the payment base value.

17. The tangible computer-readable medium of claim 16, wherein the instructions, when executed by a processor, further cause the processor to:
responsive to determining that the value of withdrawals during the payout period is more than the maximum available benefit payment value for the payout period, provide an output signal having data indicative of a reduction in the contract value and a reduction in the payment base value.

18. The tangible computer-readable medium of claim 16, wherein the instructions, when executed by a processor, further cause the processor to:
responsive to determining that the value of withdrawals during the current year is more than the available benefit payment value for the current year, provide an output signal having data indicative of a reduction in the contract value and a reduction in the payment base value.

19. The tangible computer-readable medium of claim 18, wherein the maximum available withdrawal percent for the payout period is greater than the withdrawal percent for the current year.

20. The tangible computer-readable medium of claim 18, wherein the instructions, when executed by a processor, further cause the processor to:
determine the maximum available benefit payment value for the payout period based on a withdrawal percent for the payout period and the payment base value, and determine the available benefit payment value for the current year based on a withdrawal percent for the current year and the payment base value.

* * * * *